United States Patent
Urick et al.

(10) Patent No.: US 12,455,551 B2
(45) Date of Patent: Oct. 28, 2025

(54) MORPHING OF WATERTIGHT SPLINE MODELS USING AS-EXECUTED MANUFACTURING DATA

(71) Applicant: nVariate, Inc., Austin, TX (US)

(72) Inventors: Benjamin Urick, Roseville, CA (US); Daniel L. Keller, Waitsfield, VT (US); Richard H. Crawford, Austin, TX (US)

(73) Assignee: n Variate, Inc., Austin, TX (US)

( * ) Notice: Subject to any disclaimer, the term of this patent is extended or adjusted under 35 U.S.C. 154(b) by 0 days.

(21) Appl. No.: 18/963,285

(22) Filed: Nov. 27, 2024

(65) Prior Publication Data

US 2025/0181056 A1 Jun. 5, 2025

Related U.S. Application Data

(60) Provisional application No. 63/604,626, filed on Nov. 30, 2023.

(51) Int. Cl.
*G05B 19/4097* (2006.01)
(52) U.S. Cl.
CPC ............... *G05B 19/4097* (2013.01)
(58) Field of Classification Search
CPC .............................. G05B 19/4097
See application file for complete search history.

(56) References Cited

U.S. PATENT DOCUMENTS

| | | | |
|---|---|---|---|
| 6,996,505 B1 * | 2/2006 | Edelsbrunner | G06T 17/205 703/2 |
| 7,274,364 B2 | 9/2007 | Sederberg | |
| 9,269,189 B1 | 2/2016 | Marinov et al. | |
| 9,652,696 B2 | 5/2017 | Won | |
| 9,996,075 B2 | 6/2018 | Simon et al. | |
| 2017/0368753 A1 | 12/2017 | Yang et al. | |
| 2019/0033461 A1 * | 1/2019 | Wingert | G06T 7/0006 |

(Continued)

OTHER PUBLICATIONS

Baumann et al. "From GCode to STL: Reconstruct Models from 3D Printing as a Service" from "IOP Conf. Series: Materials Science and Engineering 280 (2017) 012033" (Year: 2017).*

(Continued)

*Primary Examiner* — Yuhui R Pan
(74) *Attorney, Agent, or Firm* — Kowert, Hood, Munyon, Rankin & Goetzel, P.C.; Jeffrey C. Hood; Luke Langsjoen

(57) ABSTRACT

Methods and computer systems for methods, computer systems, and computer-readable memory media for determining a warp function. An as-designed watertight spline model of an object is received. A set of sweep points along a sweep trajectory for manufacturing the object are used to determine a sweep surface. Model points are sampled from the as-designed watertight spline model and projected onto nearest as-executed points on the sweep surface. The projected as-executed points are used to construct an as-executed model of the object. A warp function is determined based on a difference between the as-designed watertight spline model and the as-executed model. The warp function is a continuous function approximating differences between the as-designed model and the as-manufactured object. The warp function is stored in a non-transitory computer-readable memory medium.

23 Claims, 19 Drawing Sheets

(56) References Cited

U.S. PATENT DOCUMENTS

| | | |
|---|---|---|
| 2020/0074028 A1 | 3/2020 | Yang et al. |
| 2022/0245305 A1* | 8/2022 | Yang .................... B29C 64/386 |
| 2023/0030783 A1 | 2/2023 | Urick et al. |
| 2023/0117766 A1 | 4/2023 | Yang et al. |
| 2023/0264264 A1 | 8/2023 | Prentice et al. |

OTHER PUBLICATIONS

International Search Report and Written Opinion in International Application No. PCT/US2023/027831, mailed Dec. 18, 2023, 21 pages.

Invitation to Pay Additional Fees and, Where applicable Protest Fee; International Application No. PCT/US2023/027831, mailed Oct. 26, 2023, 14 pages.

B. Urick, R. H. Crawford, R. Jennings, and G. Vernon, "Watertight Tensor-Product Spline Reconstruction," United States Department of Energy, Kansas City, Missouri, Technical Report NSC-614-2949, 31 pages, Jul. 2020.

Lei, et al, "NURBS-based fast geometric error compensation for CNC machine tools"; International Journal of Machine Tool Design and Research, Pergamon Press, Oxford, GB; vol. 48, No. 3-4; Oct. 24, 2007; pp. 307-319.

Praveen, K. et al, "Tool path design system to enhance accuracy during double sided incremental forming: An analytical model to predict compensations for small/large components"; J. Manufacturing Processes; vol. 58; pp. 510-523; 2020.

Zhang, B. et al, "Distortion Prediction and NURBS Based Geometry compensation for Reducing Part Errors in Additive Manufacturing"; Procedia Manufacturing; vol. 48; pp. 706-717; 2020.

Urick, B. et al, "Reconstruction of Trimmed NURBS Surfaces for Gap-Free Intersections"; J. Computing & Information Science in Engineering; vol. 20; 2020; 14 pgs.

Sobh, T. et al, "Analyzing Manufacturing Tolerances for Sensing and Inspection"; Int'l J. Science Technology; 1998; 25 pgs.

L. A. Piegl and W. Tiller; "The NURBS Book", 2nd ed. Berlin; New York: Springer; pp. 134-135, 232-235, 360-453, and 472-485; 1997.

G. Farin; "Curves and Surfaces for CAGD: A Practical Guide"; 5 edition. San Francisco, CA: Morgan Kaufmann, pp. 147-153; 2001.

E. Cohen, R. F. Riesenfeld, and G. Elber, "Geometric Modeling With Splines: An Introduction"; Natick, Mss: AK Peters, 2001; pp. 396-398 and 440-442.

Sarraga, R. F., "Modifying CAD/CAM Surfaces According to Displacements Prescribed at a Finite Set of Points" Computer Aided Design, Elsevier; vol. 36, No. 4, Feb. 2004; 7 pgs.

International Search Report and Written Opinion; International Publication No. PCT/US2024/057891; mailed Mar. 3, 2025; 19 pgs.

\* cited by examiner

MORPHING OF WATERTIGHT SPLINE MODELS USING AS-EXECUTED MANUFACTURING DATA

PRIORITY CLAIM

This application claims priority to Provisional Application No. 63/604,626 titled "Morphing of Watertight Spline Models Using As-Executed Manufacturing Data", filed on Nov. 30, 2023, which is hereby incorporated by reference as though fully and completely set forth herein.

ACKNOWLEDGEMENT OF GOVERNMENT SUPPORT

This invention was made in part with Government support under Honeywell Federal Manufacturing and Technologies (HFMT) Purchase Order Numbers: N000468718 and N000511856. The purchase orders were issued under HFMT's prime contract DE-NA0002839 and awarded by the United States Department of Energy. The Government has certain rights in the invention.

FIELD OF THE INVENTION

The present invention relates to the areas of Computer-Aided Design (CAD), Computer-Aided Manufacturing (CAM), Computer-Aided Engineering/Analysis (CAE), Computer-Aided Inspection (CAI), Computer Numerical Control (CNC), watertight spline surfaces, solid modeling, geometric modeling, digital twins, digital thread, digital lifecycle, and related fields. The technology is related to the methods of producing computer representations of manufactured components.

DESCRIPTION OF THE RELATED ART

Computer-Aided disciplines (CAx) in the design-through-manufacturing workflow (i.e., Computer-Aided Design (CAD), Computer-Aided Engineering/Analysis (CAE), Computer-Aided Manufacturing (CAM), and Computer-Aided Inspection (CAI)) were initially developed independently within their own fields and technical domains. Now, in pursuit of an integrated Model-Based Enterprise (MBE), the industry is realizing that these historically separated disciplines often use very different model representations, e.g., the underlying mathematical data behind a 3D-model. Manufacturing process data is created for use by CNC machines, additive manufacturing (AM) machines, etc., as parts are created. This machine instruction data includes geometric (spatial) data as to how the machine tool or laser moved while creating the part (i.e., "feeds and speeds"). The instructions for the machine (process models, or "as-instructed" data) are differentiated from the actual data gathered from monitoring the machine tool (e.g., telemetry, or "as-executed" data). While there is presently ample ability to collect these data streams, there are few applications for resolving this data spatially in an automated fashion with the CAD design model. This leads directly to significant barriers in utilizing the data for decision making via a digital twin CAD model, SPC data regression, or machine learning (ML) and artificial intelligence (AI) for use in quantifying and improving manufacturability, surface finish quality, and accurate dimensions on the finished part. As such, improvements in the field of CAx modeling may be desirable.

SUMMARY

Embodiments are presented herein of methods, computer systems, and non-transitory computer-readable memory media for determining a warp function.

In some embodiments, a computing device receives an as-designed watertight spline model of a tangible object. The as-designed watertight spline model may be described in a Computer-Aided Design (CAD) model domain.

In some embodiments, a set of sweep points along a sweep trajectory for a manufacturing tool is received. A sweep surface may be determined based at least in part on the set of sweep points.

In some embodiments, a plurality of model points on the as-designed watertight spline model is sampled, and each model point is projected onto a nearest as-executed sample point on the sweep surface to obtain a point-cloud of as-executed sample points on the sweep surface.

In some embodiments, an as-executed model of the tangible object is constructed based at least in part on the point-cloud of as-executed sample points and the as-designed watertight spline model.

In some embodiments, a warp function is determined based on a difference between the as-designed watertight spline model and the as-executed model of the tangible object. The warp function is a continuous (or piece-wise continuous) function approximating differences between the tangible object and the as-designed watertight spline model.

In some embodiments, the warp function is stored in a non-transitory computer-readable memory medium.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Embodiments of the invention will now be described with reference to the attached drawings in which.

Figure 1:
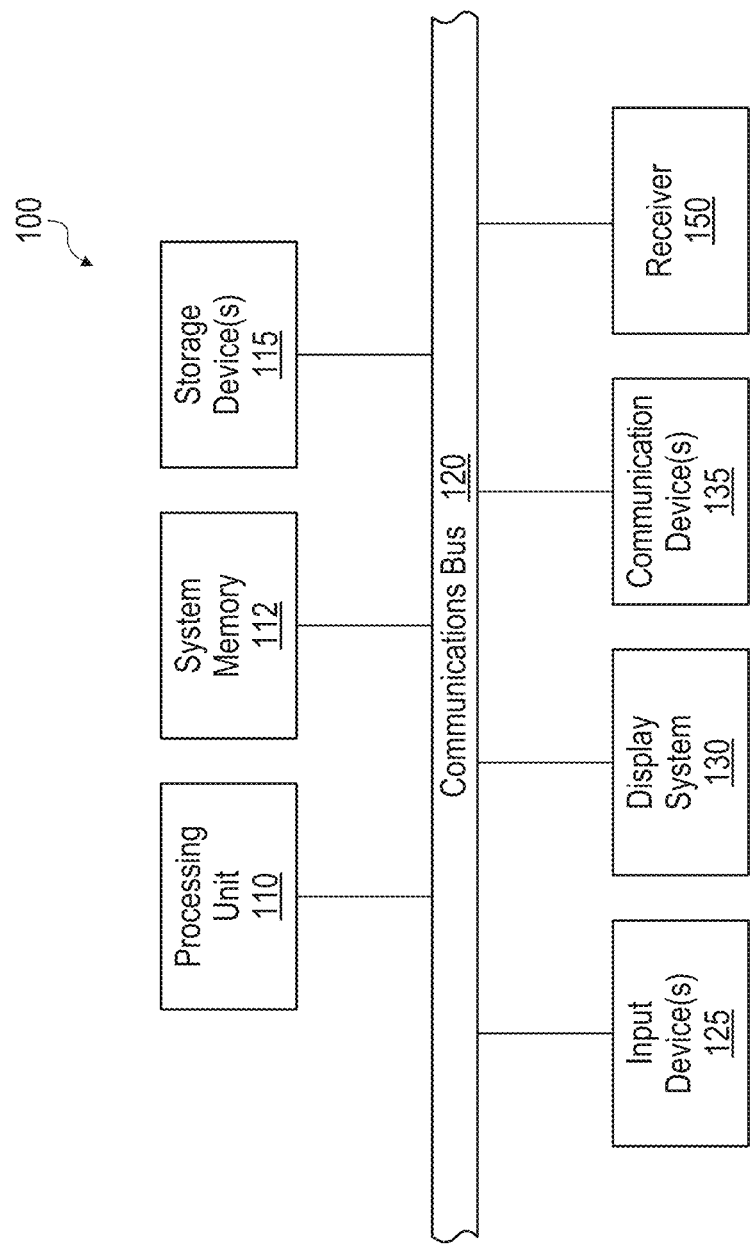
FIG. 1 is an illustration of an exemplary computer system that may be used to perform any of the method embodiments described herein, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION OF THE EMBODIMENTS

Acronyms

Various acronyms are used throughout the present application. Definitions of the most prominently used acronyms that may appear throughout the present application are provided below:

CAD: Computer-Aided Design
CAE: Computer-Aided Engineering
CAM: Computer-Aided Manufacturing
CAI: Computer-Aided Inspection
CAx: Computer-Aided x=[Design, Engineering, Manufacturing, . . . ]
B-Rep, B-rep, b-rep, Brep, brep, BREP: Boundary Representation
NURBS: Non-Uniform Rational Basis Spline
SSI: Surface-Surface Intersection
AM: Additive Manufacturing
ASME: American Society of Mechanical Engineers
BOC: Bill of Characteristics
BOM: Bill of Materials
CMM: Coordinate Measuring Machine
CNC: Computer Numerical Control
CFD: Computational Fluid Dynamics
CSG: Constructive Solid Geometry
CT: Computed Tomography
FEA: Finite Element Analysis
GD&T: Geometric Dimensioning and Tolerancing
ISO: International Organization for Standardization
IGA: IsoGeometric Analysis
MBD: Model-Based Definition
MBE: Model Based Enterprise
PLM: Product Lifecycle Management
PMI: Product and Manufacturing Information
QIF: Quality Information Framework
SPC: Statistical Process Control
STEP: STandard for the Exchange of Product model data (ISO 10303)
UUID: Universally Unique IDentifier
WBO: Watertight Boolean Operations
XML: extensible Markup Language Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), tablet computer, smart phone, television system, grid computing system, or other device or combinations of devices. In general, the term "computer system" can be broadly defined to encompass any device (or combination of devices) having at least one processor that executes instructions from a memory medium.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

DETAILED DESCRIPTION

CAD Modelling

Modern Computer-Aided Design (CAD) systems provide an environment in which users may create and edit curves and surfaces. The curves may include spline curves such as basis spline (B-spline) curves, or more generally, Non-Uniform Rational B-Spline (NURBS) curves. The surfaces may include tensor product spline surfaces such as B-spline surfaces, or more generally, NURBS surfaces, or even more generally, unstructured spline surfaces (e.g., T-, S-, U-spline surfaces). Unstructured spline surfaces allow the freedom of having T-junctions in the control net of the surface as well as other arbitrary valence topology. Tensor product spline surfaces have certain very desirable properties that make them popular as modeling tools, e.g., properties such as: localized domain of influence of each surface control point on surface geometry; controllable extent of continuity along knot lines; $C^\infty$ smoothness between knot lines; and the ability to represent complex freeform geometry in a discrete manner that is intuitive for the user.

Two significant paradigms within Computer-Aided Design with regards to the geometric modeling of an object are surface modeling and solid modeling.

In surface modeling, an object is represented simply as a set of unconnected surfaces, without maintaining a model of the topological structure corresponding to the relationships between the geometric features of the object. Thus, while the user may design two trimmed surfaces within an object that apparently intersect along a given curve, the CAD system does not explicitly record the topological or geometric relationship between the trimmed surfaces. Thus, in surface modeling, surfaces are operated on as independent entities.

In solid modeling, which is utilized for many CAx applications, the specification of an object includes the specification of both topology and geometry, which are captured in a data structure referred to as a boundary representation (Brep, B-rep, b-rep or brep). From the topological point of view, a boundary representation may include faces, edges and vertices, as well as information regarding their interconnectivity and orientation, among other possibilities. (e.g., An object includes a set of faces. Each face is bounded by a set of edges. Each edge is bounded by a pair of vertices.) From the geometric point of view, the boundary representation may include surfaces, curves and points, which correspond respectively to the faces, edges and vertices of the topological point of view. Thus, a boundary representation provides a way to store and operate on a collection of surfaces, curves and points as a unified object. In addition to faces, edges and vertices, many solid modelers provide additional objects to this data structure, such as loops, shells, half-edges, etc.

Morphing Using As-Executed Manufacturing Data

Embodiments herein describe methods and computer systems configured to increase efficiency and effectiveness in Computer-Aided disciplines (CAx) for the design-through-manufacturing workflow (i.e., Computer-Aided Design (CAD), Computer-Aided Engineering/Analysis (CAE), Computer-Aided Manufacturing (CAM), and Computer- Aided Inspection (CAI)). Embodiments herein determine a warp function that describes discrepancies between an as-designed CAD model of an object and an as-executed model of the object as manufactured. Advantageously, the described methods may allow metrology to make data-driven decisions about where to put more or less fidelity into an inspection plan for a component. This is to say that not only would the as-executed generated model be good as a comparison to the as-designed CAD model, but there is also significant value of the as-executed model in the inspection process as an input to inspection planning based on resolved manufacturing feedback data. There is also value in comparing the as-executed model with an as-inspected morphed model generated from inspection data to reconcile potential differences with the as-designed model given the two distinctive data sources, as-executed CAM and as-inspected CAI. These models can also be utilized in computational simulation using CAE methods such as Finite Element Analysis (FEA), Isogeometric Analysis (IGA), Computational Fluid Dynamics (CFD), etc.

Embodiments herein allow watertight spline CAD design models to be updated or "morphed", thereby creating an as-executed digital twin in a watertight spline representation, using data collected from a CNC-machine or other device in a way that is useful for simulation, inspection, and/or machine data archiving tasks. The machine data can be used to produce as-executed (or as-manufactured) geometrically watertight CAD models that represent the physical parts and are useful for direct simulation, informing inspection planning and programming, and/or machine data archiving. Rather than making coarse correlations to design models via closest point projection or other analysis techniques, the watertight spline based morphing process allows as-executed data (e.g., standard protocols like OPC-UA, MTConnect, and MTTQ, or proprietary protocols like FANUC's FOCAS or Okuma's THINC API) to be associated directly to the geometric description of the part being produced in a manner that allows traceability between what are currently siloed domains. The as-executed watertight spline digital twin can then be utilized for decision making related to manufacturability, Statistical Process Control (SPC) data regression, inspection/metrology, simulation, and other digital use cases through use of the warp function created between various watertight spline models (e.g., as-designed, as-executed, as-inspected, as-simulated, etc.). The process may also reveal novel ways of interpreting and leveraging the machine data to create "smarter" upstream and downstream processes related to the manufacturing operation.

Manufacturing Verification

In manufacturing verification, or manufacturing post-processing, the data obtained from a manufactured component may be interrogated to ensure that defects are not present and that the component was made per the manufacturing intent. Product specifications, also referred to as Product and Manufacturing Information (PMI), e.g., manufacturing notes, surface finish, dimensions and tolerances as per ASME Y14.5 Geometric Dimensioning and Tolerancing (GD&T), are annotations to the CAx models that communicate product requirements. Two types of PMI are typically utilized in the industry, semantic PMI that is machine readable with data associated directly to the model and graphical PMI, in which the information is human-readable by presentation in a drawing or rendering, often using domain-specific graphical symbology.

In some embodiments, the design-manufacturing workflow may follow one or more of the following five steps: (1) the product is designed and PMI is produced; (2) manufacturing process models (e.g., what is being instructed) are created based on manufacturing specifications, resources, and processes; (3) as-instructed data is determined, e.g., the specific tool operations required for a machine to make the component (e.g., gcode); (4) the as-instructed data is executed, performing manufacturing and generating as-executed data; and (5) as-executed data is analyzed. These steps may then be repeated when there are modifications within the design and/or manufacturing process. Automated methods for collecting as-executed data vary per manufacturing process, modality, tooling, data collection resources, computer and network capabilities, etc. Embodiments herein may be applicable to a variety of types of manufacturing methods. In some embodiments, the manufacturing information may serve as an input that is agnostic to the means of obtaining the as-executed data.

One of the difficulties in analyzing the as-executed data is that a formal relationship between physical parts, manufacturing data, and the CAD design model may be difficult to construct. Some current implementations are unable to directly modify the CAD model to update the representation based on manufacturing data. The prior art manufacturing paradigm may involve constructing new meshed, faceted, or voxelized model representations from the manufacturing data set of points; however, this manufacturing model has no link or relationship to the CAD design model. In addition, the process of converting the CAD model to a meshed, faceted, or voxelized representation may result in the loss of the metadata, including PMI, that may have been attached to the original design model, as well as loss of accuracy due to the linear nature of faceted approximations.

Embodiments herein describe a morphing method, in either standard form or utilizing semantic PMI as an additional input, that produces a warp function that characterizes differences between the as-designed and as-manufactured (as-instructed, as-executed) object. First, the relationship between the watertight spline design model and the morphed, as-executed inspection model is created (i.e., a digital twin). Because the watertight spline design model is directly modified in this operation from the input data, it eliminates the painstaking process of generating a mesh, tessellation, or any other intermediate geometric modeling representation based on manufacturing data. Further, the relationship created between design and morphed manufacturing model via this method provides a means of maintaining semantic PMI data throughout the design-through-manufacturing lifecycle. Finally, it serves to standardize the interpretation of manufacturing data in the manufacturing process plan that in some current implementations is created anecdotally by manufacturing (process) engineers.

FIG. 1: Computer System

FIG. 1 illustrates one embodiment of a computer system 100 that may be used to perform any of the method embodiments described herein, or, any combination of the method embodiments described herein, or any subset of any of the method embodiments described herein, or, any combination of such subsets.

In some embodiments, a hardware device (e.g., an integrated circuit, or a system of integrated circuits, or a programmable hardware element, or a system of programmable hardware elements, or a processor, or a system of interconnected processors or processor cores) may be configured based on FIG. 1 or portions thereof. Any hardware device according to FIG. 1 may also include memory as well as interface circuitry (enabling external processing agents to interface with the hardware device).

Computer system 100 may include a processing unit 110, a system memory 112, a set 115 of one or more storage devices, a communication bus 120, a set 125 of input devices, and a display system 130.

System memory 112 may include a set of semiconductor devices such as RAM devices (and perhaps also a set of ROM devices).

Storage devices 115 may include any of various storage devices such as one or more memory media and/or memory access devices. For example, storage devices 115 may include devices such as a CD/DVD-ROM drive, a hard disk, a magnetic disk drive, a magnetic tape drive, semiconductor-based memory, etc.

Processing unit 110 is configured to read and execute program instructions, e.g., program instructions stored in system memory 112 and/or on one or more of the storage devices 115. Processing unit 110 may couple to system memory 112 through communication bus 120 (or through a system of interconnected busses, or through a computer network). The program instructions configure the computer system 100 to implement a method, e.g., any of the method embodiments described herein, or, any combination of the method embodiments described herein, or, any subset of any of the method embodiments described herein, or any combination of such subsets.

Processing unit 110 may include one or more processors or processing elements configured to execute program instructions stored in memory to perform methods of the described embodiments. In some embodiments the processing unit 110 may be a programmable hardware element that may be utilized to perform the described methods. A programmable hardware element may include various hardware devices comprising multiple programmable function blocks connected via a programmable interconnect. Examples include field programmable gate arrays (FPGAs), programmable logic devices (PLDs), field programmable object arrays (FPOAs) and complex PLDs (CPLDs). The programmable function blocks may range from fine grained (combinatorial logic or look up tables) to coarse grained (arithmetic logic units, graphics processing units (GPUs), or processor cores). A programmable hardware element may also be referred to as "reconfigurable logic". As another option, an integrated circuit with dedicated hardware components such as an application specific integrated circuit (ASIC) may be used to perform the methods described herein.

One or more users may supply input to the computer system 100 through the input devices 125. Input devices 125 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), an accelerometer (or set of accelerometers), or any combination thereof. In some embodiments, the computer system 100 may be configured to receive direct input of PMI data from an apparatus such as a positional probe, a machine tool, or the like.

The display system 130 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 100 may include other devices, e.g., devices such as one or more graphics devices (e.g., graphics accelerators), one or more speakers, a sound card, a video camera and a video card, a data acquisition system.

In some embodiments, computer system 100 may include one or more communication devices 135, e.g., a network interface card for interfacing with a computer network (e.g., the Internet). As another example, the communication device 135 may include one or more specialized interfaces for communication via any of a variety of established communication standards or protocols or physical transmission media.

The computer system 100 may be configured with a software infrastructure including an operating system, and perhaps also, one or more graphics APIs (such as OpenGL®, Direct3D, Java 3D™).

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a computer embedded in a living organism, etc.

Figure 2:
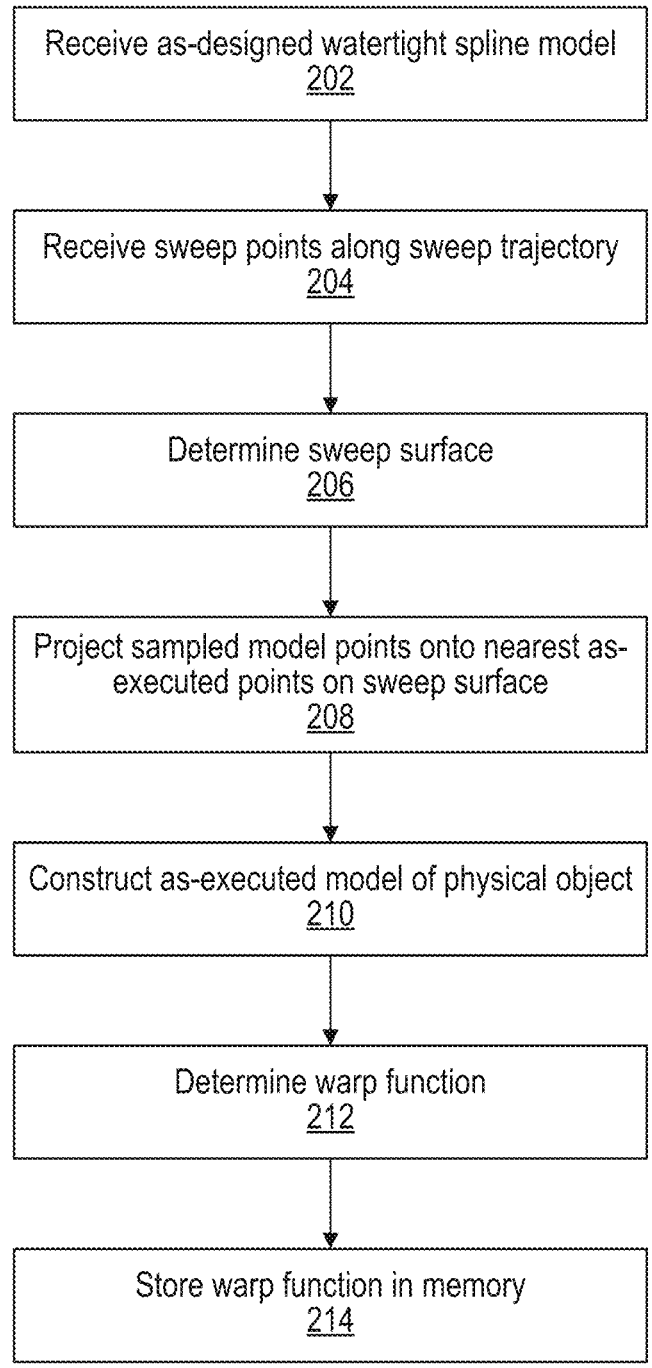
FIG. 2 is a flowchart diagram illustrating a method for determining a warp function, according to some embodiments.

FIG. 2—Flowchart for Determining a Warp Function from a Watertight Spline Model FIG. 2 is a flowchart diagram illustrating a method for determining a warp function that characterizes discrepancies between as-designed and as-executed watertight spline models. In reference to FIG. 2, the as-designed watertight spline model refers to the received CAD model of the nominal object design, whereas the as-executed watertight spline model refers to the model that is constructed using as-executed data from a manufacturing tool (and, in some embodiments, also using metadata associated with as-designed, as-instructed, and/or as-executed data). The manufacturing tool may provide a data stream generated during the manufacturing process of the object, which describes locations of the manufacturing tool at a sequence of points in time. In this case, the warp function characterizes differences between the target model and the as-executed object.

In creating a relationship between the CAD design model and the as-executed model (i.e., a digital twin), watertight modeling may expedite the engineering workflow. The relationship created between the design and the morphed as-executed model via the described methods provides a means of maintaining semantic PMI data throughout the design-execution-inspection lifecycle. Further, it helps link other engineering domains that currently remain siloed in the design-manufacturing-inspection-simulation process.

More generally, the first and second watertight spline models may be described in any two distinct Computer-Aided (CAx) model domains, such as CAD, Computer-Aided Engineering (CAE), Computer-Aided Manufacturing (CAM), Computer-Aided Inspection (CAI), etc., and the warp function describes differences between the two models in their respective domains. Workflows may be tightly coupled between the currently disparate engineering domains of CAD, CAI, CAM, and CAE, in which as-designed (CAD), as-planned (CAI), as-inspected (CAI), as-instructed (CAM), as-executed (CAM), and as-simulated (CAE) models are formally related utilizing watertight spline models and warp functions. These models may then benefit from interoperability provided by neutral file standards.

The method shown in FIG. 2 may be used in conjunction with any of the computer systems or devices shown in the above Figures, among other devices. For example, a processor or processing element of a computer device may store program instructions in a non-transitory computer-readable memory medium that, when executed, cause the computer device to perform the recited method steps of receiving, processing, and storing information, as described below. In various embodiments, some of the method elements shown may be performed concurrently, in a different order than shown, or may be omitted. Additional method elements may also be performed as desired. As shown, the method may operate as follows.

At 202, an as-designed watertight spline model of a tangible object is received, which for simplicity may be referred to as the as-designed model. In some embodiments, the as-designed model may be a geometrically watertight Computer-Aided Design (CAD) spline model, a non-uniform rational basis spline (NURBS) model, a T-spline model, an S-spline model, a U-spline model, a subdivision (Sub-D) surface model, or a basis spline (B-spline) model, among other possibilities.

In some embodiments, the as-designed watertight spline model is an object design of a physical object that is manufacturable by any of a variety of means (e.g., using Computer Numerical Control (CNC) machining or additive manufacturing (AM), among other possibilities). The object design may be in a format (e.g., CAD), that is receivable by a CNC or AM machine to manufacture the object. The watertight spline model may be a CAD spline model that represents the entire outer surface(s) and/or inner surface(s) of the physical object. For example, the physical object may have internal gaps or voids, in which case the as-designed model may include these inner surfaces as well as the external-facing surface(s). In other words, the as-designed model may represent the entirety of the boundary or boundaries of the physical object.

Figure 3:
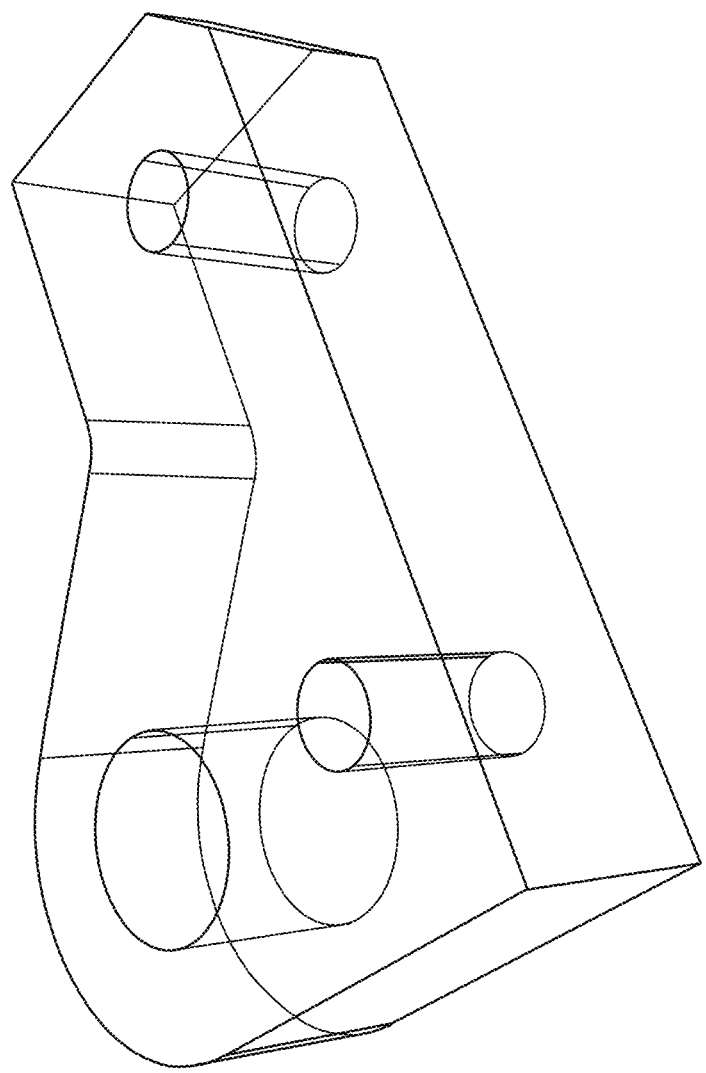
FIG. 3 illustrates an as-rendered image of an as-designed CAD model of an object, according to some embodiments.
Figure 4:
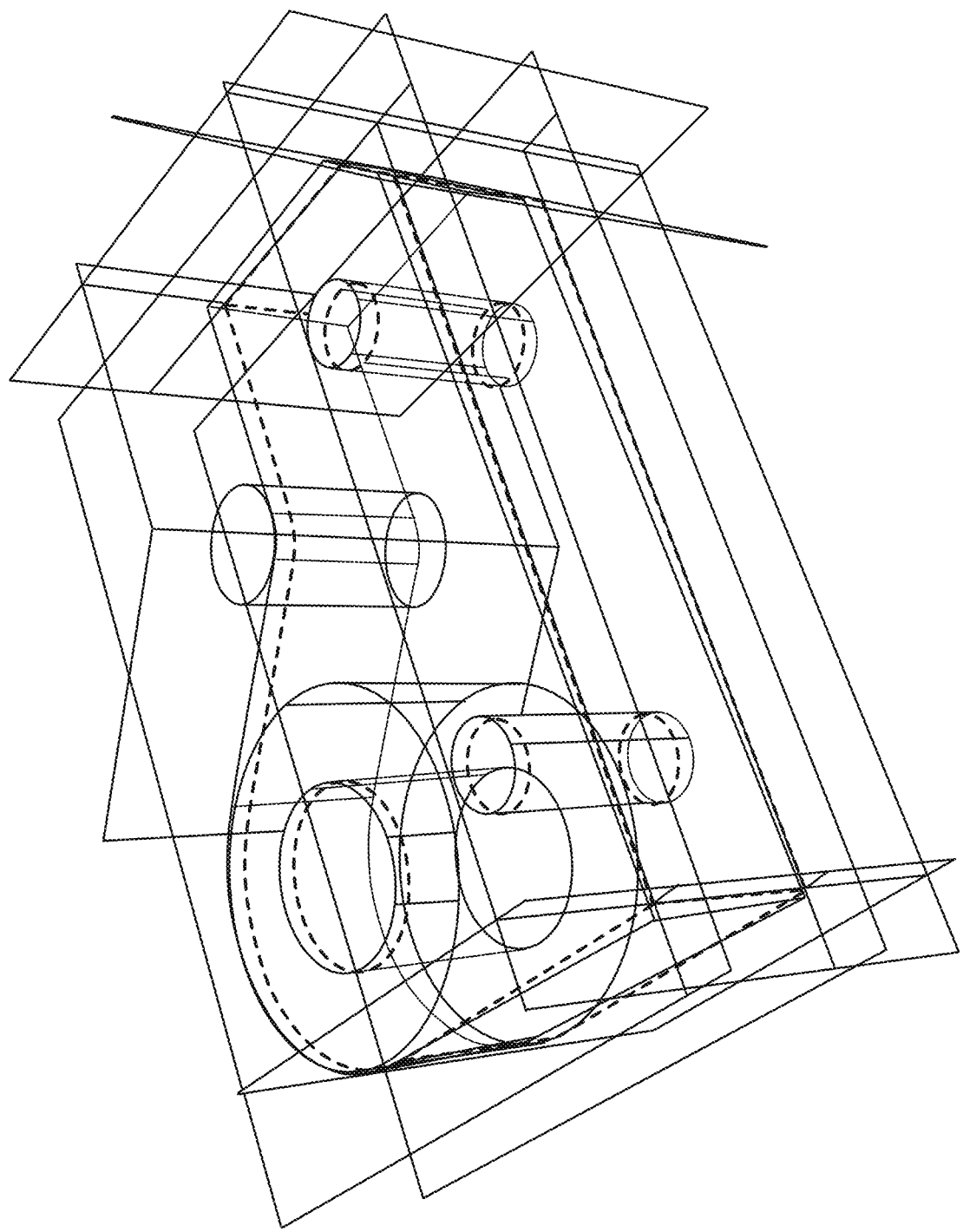
FIG. 4 illustrates an untrimmed, non-watertight as-designed CAD model of an object, according to some embodiments.
Figure 5:
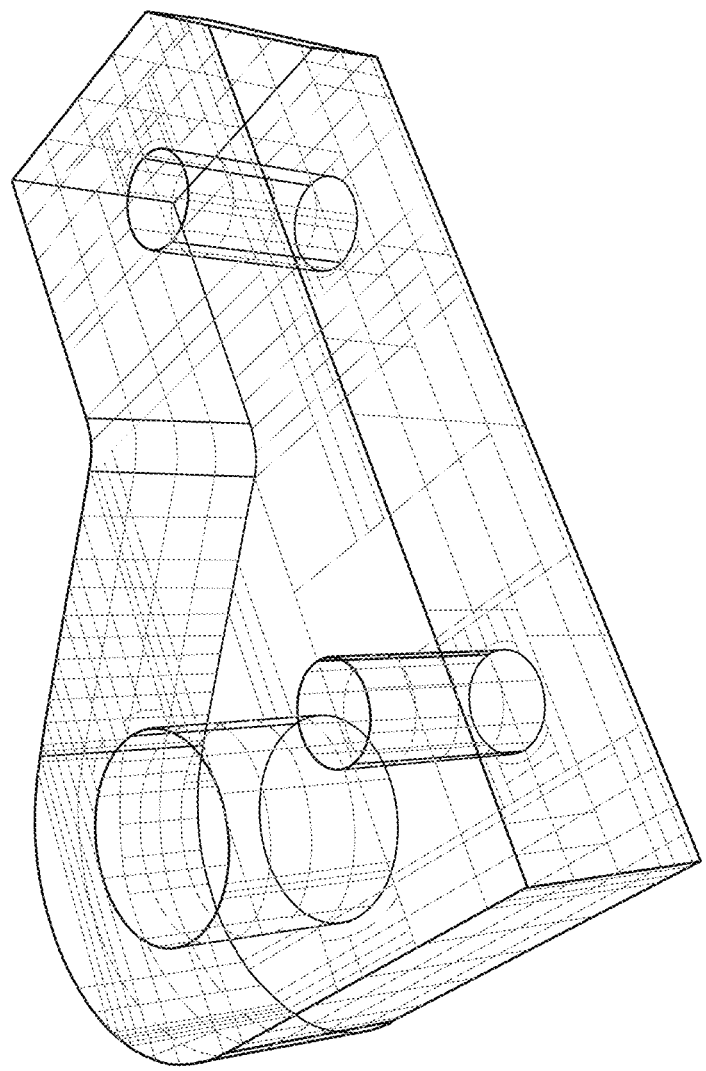
FIG. 5 illustrates a watertight as-designed CAD model of an object, according to some embodiments.

In some embodiments, the as-designed model is constructed from a non-watertight as-designed CAD model. FIG. 3 illustrates an as-rendered image of an example non-watertight as-designed CAD model of an object, according to some embodiments. FIG. 4 illustrates the untrimmed non-watertight model corresponding to the trimmed model shown in FIG. 3. This model may be transformed into a watertight as-designed CAD model of the physical object, as shown in FIG. 5.

In some embodiments, a Computer-Aided Design (CAD) boundary representation (B-rep) model of the object design is received, and the as-designed watertight spline model is constructed using the CAD B-rep model.

In some embodiments, the tangible object is manufactured based on the as-designed watertight spline model. The tangible object may be manufactured by utilizing a manufacturing tool along a sweep trajectory. In various embodiments, the manufacturing tool may perform subtractive manufacturing (e.g., a CNC machine, a laser, a router, etc.), or additive manufacturing (e.g., 3D printing using a nozzle, etc.).

Figure 6:
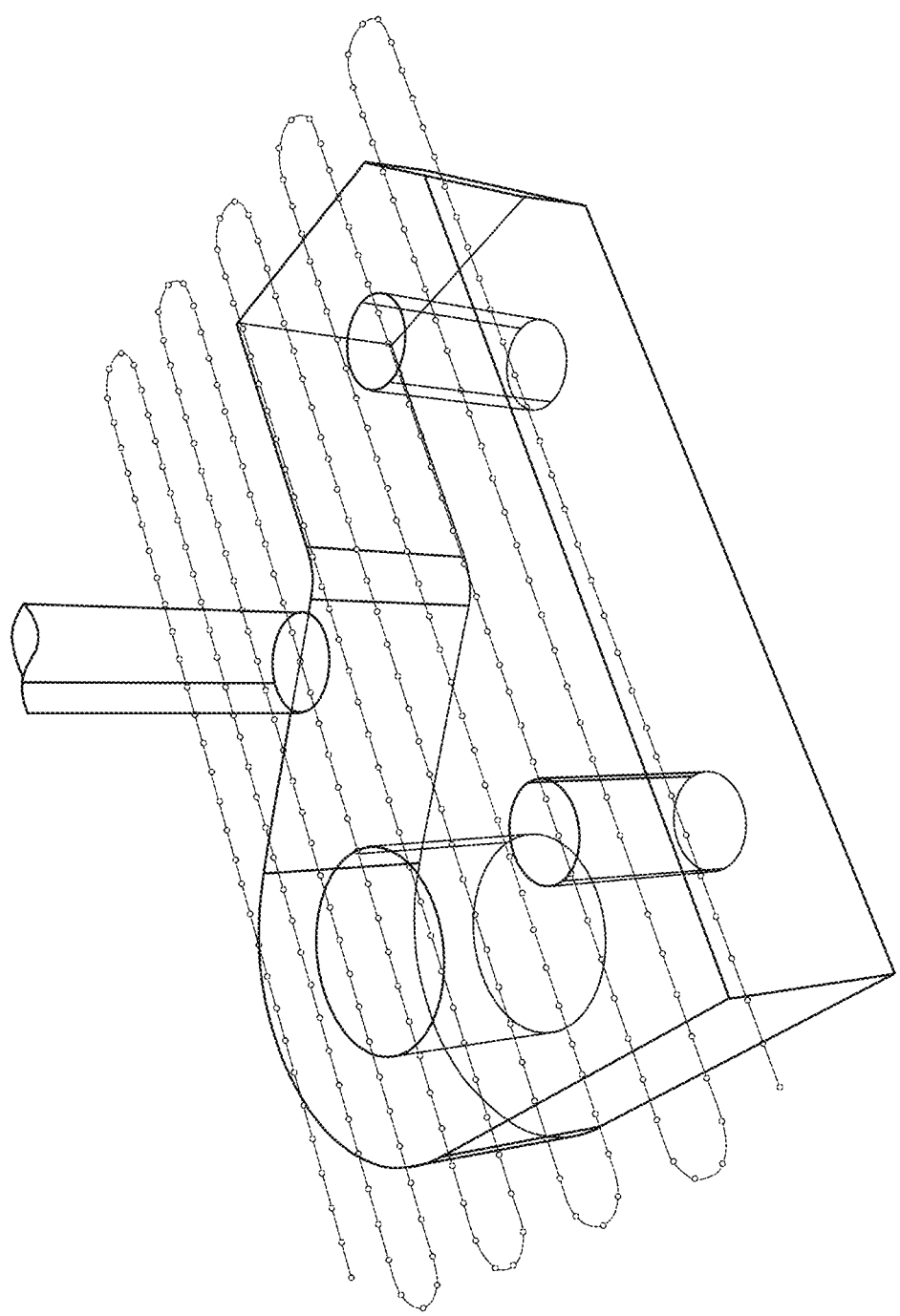
FIG. 6 illustrates a CAD model of a physical object, an as-executed tool path as a curve, a sequence of tool point locations, and the manufacturing tool head, according to some embodiments.

At 204, a set of sweep points along a sweep trajectory for a manufacturing tool is received. Each sweep point may describe a location of the manufacturing tool at a respective point in time. The sweep points may be measured locations of the manufacturing tool, e.g., obtained by a contact or non-contact inspection device. In some cases the manufacturing tool controller may internally track the location of its tool head at a sequence of points in time, and this may be provided by the machine controller as the set of sweep points. A set of sweep points may be a set of sequential points representing the actual tool location at specific times from the actual machine manufacturing of the tangible object. The set of points may further include metadata that provides a description of the tool and/or process data used or generated at those recorded point samples (e.g., the tool description, tool temperature, tool geometry, tool model, or machine parameters, such as horsepower, coolant flow, tool speed, among other possibilities). FIG. 6 illustrates an example sweep trajectory and set of sweep points for a manufacturing tool that sweeps along an upper surface of an object model.

At 206, a sweep surface is determined based at least in part on the sweep trajectory. In some embodiments, in determining the sweep surface, an approximate sweep trajectory (e.g., path curve) is determined based on the set of sweep points, and the sweep surface is determined based on the approximate sweep trajectory, a physical shape of the manufacturing tool (e.g., a profile curve), and/or metadata associated with the manufacturing tool. To determine the sweep trajectory, interpolation and/or approximation may be performed between adjacent sweep points to construct the approximate sweep trajectory. For example, the sequence of sweep point locations at specific times may be interpolated or approximated to generate a curve representing the path the tool took in the manufacturing of the part (e.g., as shown in FIG. 6).

In some embodiments, using the toolpath curve, a sweep surface can be generated using the profile curve obtained from the surface or solid model representing the description of the tool. This may be accomplished by obtaining the profile curve transverse to the toolpath curve from the description of the tool and performing a sweep surface operation using conventional methods in the CAD and the solid modeling field.

Note that performing the sweep surface operation does not limit the types of tool profiles or profile curves used as transverse curve inputs in the sweep surface operation. Tools having simple (e.g., square or rounded endmills) to complex profiles (contour shaped endmills) can be successfully accommodated using this methodology. Further, the sweep surface generated using the toolpath curve need not be limited to planar faces perpendicular to the tool orientation (e.g., as shown in FIG. 6), but can be employed in deep internal part cut paths, complex milling paths around the part, or for features such as holes, slots, facets, and chambers. To generate the appropriate swept surface, the appropriate profile curve transverse to the toolpath curve may be selected to provide for the intended surface as contacted by the tool part during that operation.

In some embodiments, the path curve generated may be parameterized such that the univariate curve parameter, t, corresponds to the specific time, T, from the machine manufacturing data stream, such that $t_i=T_i$ for each sweep point i. Advantageously, this relates the as-executed data specifically to the derived geometric as-executed representation.

In some embodiments, as-executed semantic PMI data (e.g., temperature, feed rate, part ID, etc.) reported at specific times, $T_i$, may be associated with the parametric toolpath curve parameterized by t through the relationship $t_i=T_i$. Therefore, semantic PMI data can be related to the parametric toolpath curve control points, $\{P_i\}$, using the relationship between curve parameter, curve value, control points, and basis functions:

$$C(t)=\Sigma_{i=0}^{n} R_i(t)P_i$$

Figure 7:
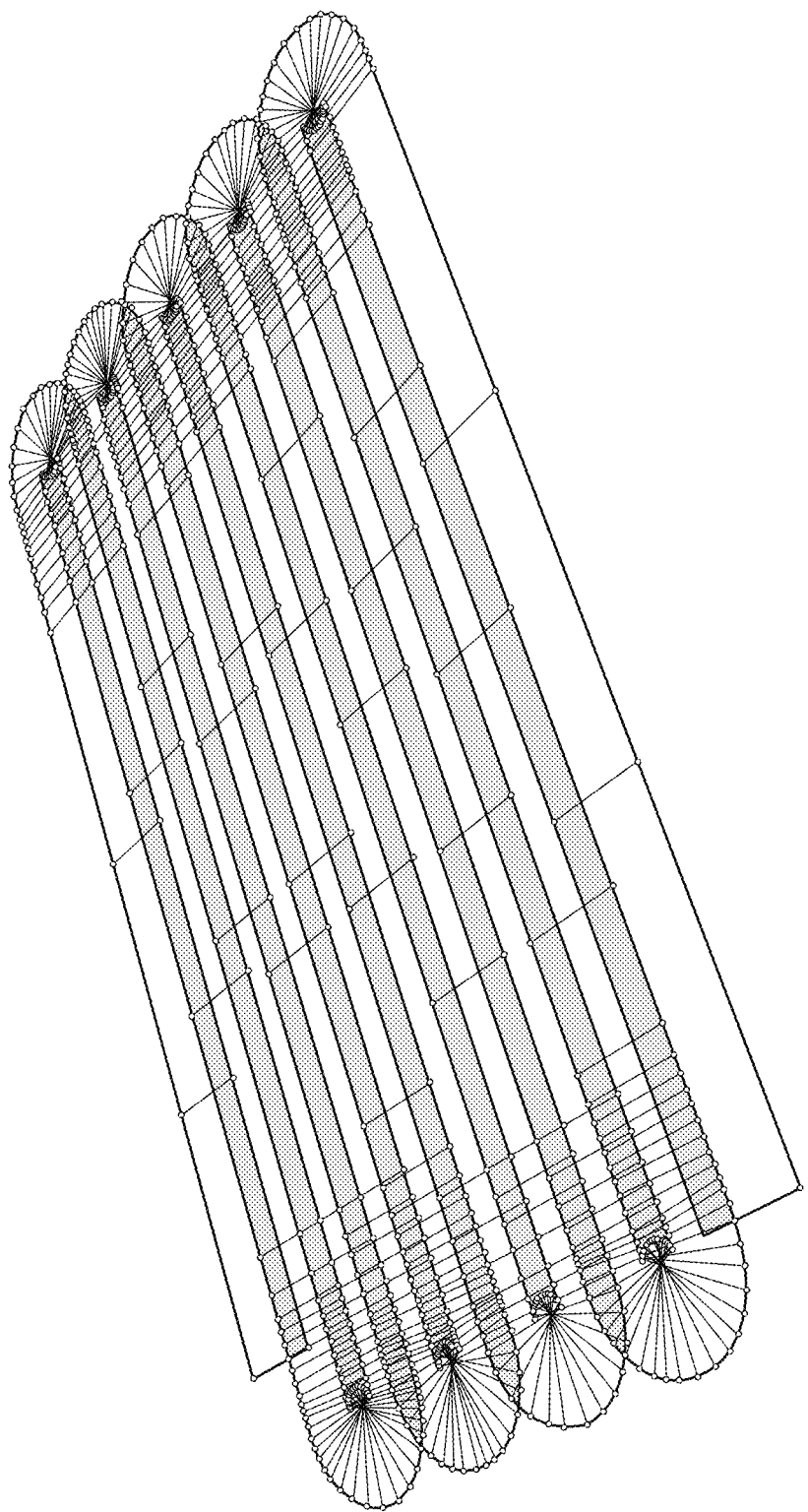
FIG. 7 illustrates an as-executed sweep surface with associated control polygons, according to some embodiments.
Figure 8:
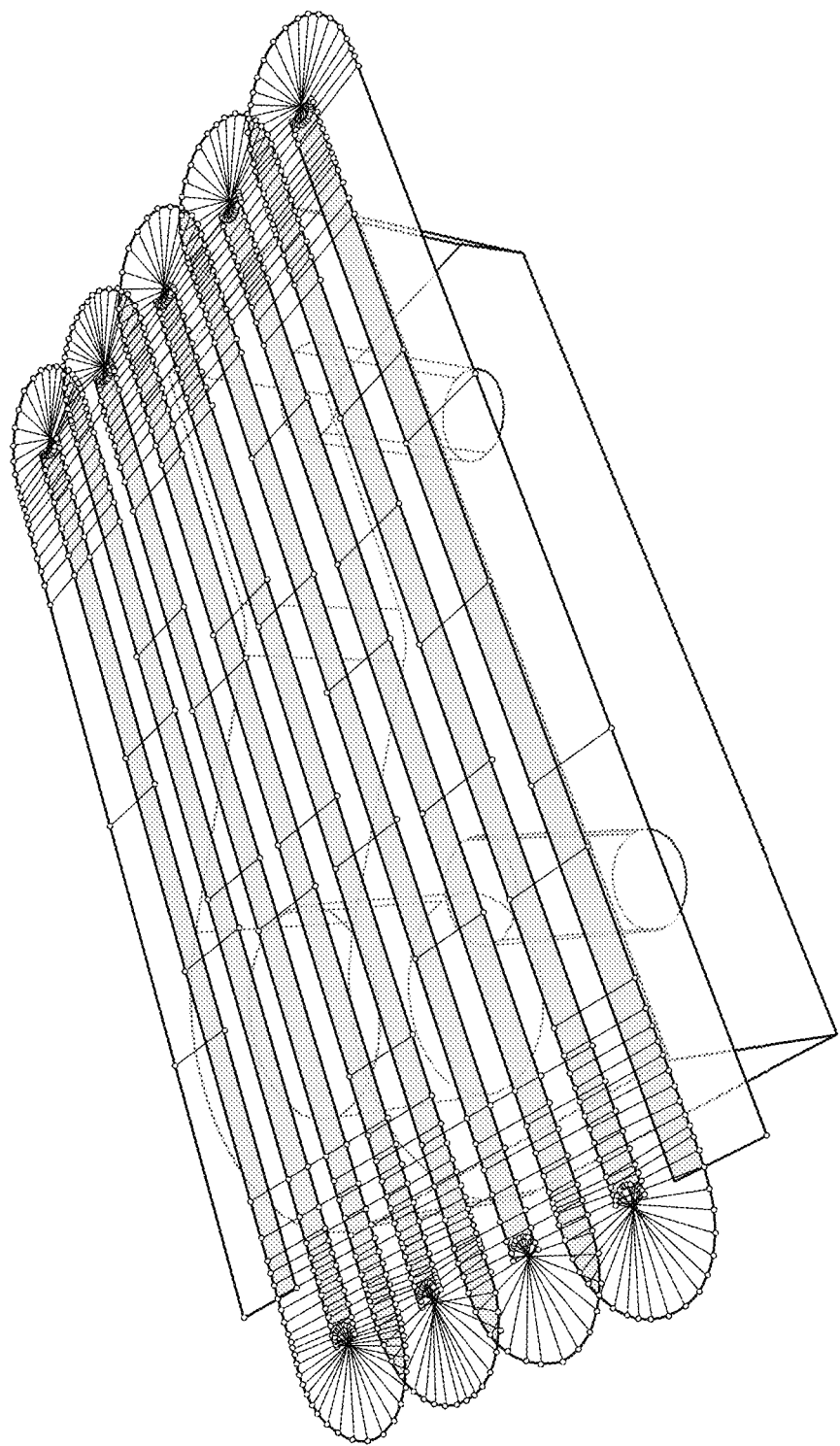
FIG. 8 illustrates a sweep surface superimposed on an upper surface of a watertight as-designed CAD model of an object, according to some embodiments.

A sweep surface (with associated control polygons) associated with the example sweep trajectory of a tool profile head along a curved tool path is shown in FIG. 7. FIG. 8 then illustrates the as-executed sweep surface superimposed over the upper surface of the as-designed model. When the tool head is a subtractive manufacturing tool such as a CNC machine, the tool etches away material over the sweep surface to produce the upper surface of the object. Alternatively, for an additive manufacturing tool, the sweep surface deposits material along a portion of the sweep surface to manufacture the upper surface of the object.

In some embodiments, data describing the (intended) sweep trajectory may be received, which may differ to some degree from the set of sweep points of the (as-executed) measured sweep trajectory. The data describing the intended sweep trajectory may be as-instructed Computer-Aided Manufacturing (CAM) data or toolpath instructions, among other possibilities. For example, machine sensors may record the actual position of the manufacturing tool at periodic time intervals to determine the set of sweep points, which may be slightly different from the instructed sweep trajectory. Alternatively, the machine controller may report the commanded locations and orientations transmitted to the manufacturing machine actuators. In these embodiments, the derived as-executed sweep trajectory may be determined by morphing the as-instructed sweep trajectory based on the set of as-executed sweep points.

When the input machine instruction data is available (also known as the as-instructed CAM data or toolpath instructions), the toolpath instructions are commonly given as a curve in space (e.g., G-code) and may be updated, or morphed, using the sequence of sweep point locations at specific times to provide an as-executed curve in space that interpolates or approximates those points. Various methods may be used to convert an existing curve in space to be represented in spline form to interpolate or approximate a set of points. After being converted to spline form, using knot insertion and reparameterization techniques, the as-instructed curve can be updated without geometric distortion to have the same structure as the as-executed curve representing the toolpath. The relationship between as-instructed and as-executed toolpath curves therefore are related by a warp function of univariate parameterized curves (e.g., the warp function ƒdW defined below at steps 1216 and 1318).

As-instructed semantic PMI data (e.g., temperature, feed rate, part ID, etc.) given at specific time, $T_i$, can be associated to the derived parametric toolpath curve parameterized by t through the relationship $t_i=T_i$. Therefore, as-instructed semantic PMI data can be related to the parametric toolpath curve control points, $\{P_i\}$, using the relationship between curve parameter, curve value, control points, and basis functions:

$$C(t)=\Sigma_{i=0}^{n} R_i(t)P_i$$

Given the warp function relating the as-instructed and as-executed curves, the an-instructed PMI and as-executed PMI can also be related using the relationship given by the warp function through the above curve-PMI relationship.

At 208, model points on the as-designed watertight spline model are sampled and projected onto a nearest as-executed surface point (e.g., a nearest point projection) on the sweep surface to obtain a point-cloud of as-executed points on the sweep surface. Note that the projected points on the sweep surface may be different from the set of sweep points received from the manufacturing tool controller. The sweep surface is constructed from the set of sweep points, and then the sampled model points of the as-designed model are projected onto a nearest point on the sweep surface. Using the watertight spline model, points can be sampled, or evaluated, from the surface at corresponding parameters $(\overline{u}_\alpha^k, \overline{v}_\alpha^k)$. Various methods may be used for performing point sampling or evaluation. Performing point projection may then generate a point cloud data set representing as-executed surface points that may be represented as either $\{Q_k\}$ (for a set of unordered points), or $\{Q_{k,l}\}$ (for a set of points that are ordered bidirectionally).

Figure 9A:
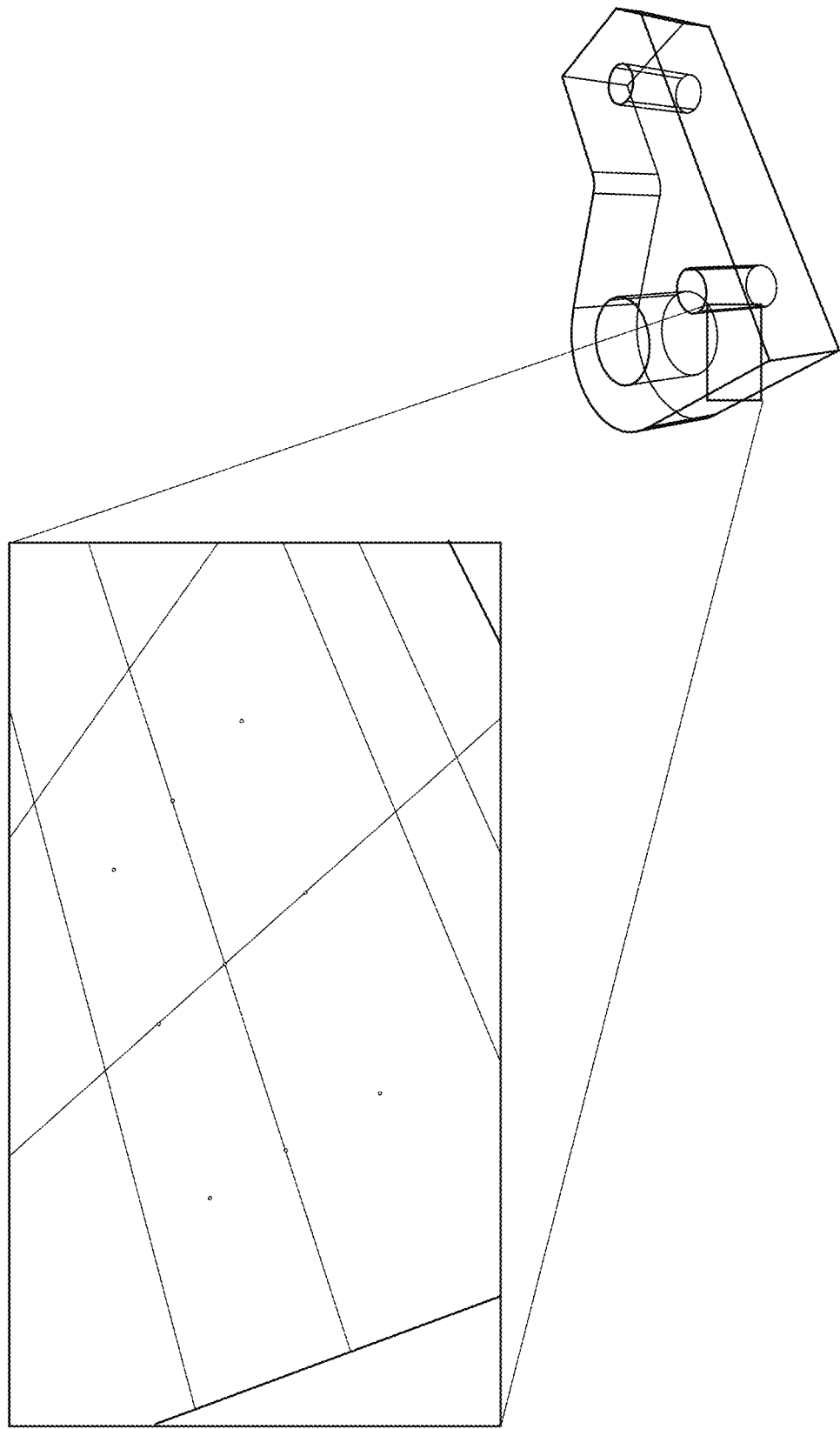
FIG. 9A illustrates a detailed section of watertight nominal as-designed CAD model, according to some embodiments.
Figure 9B:
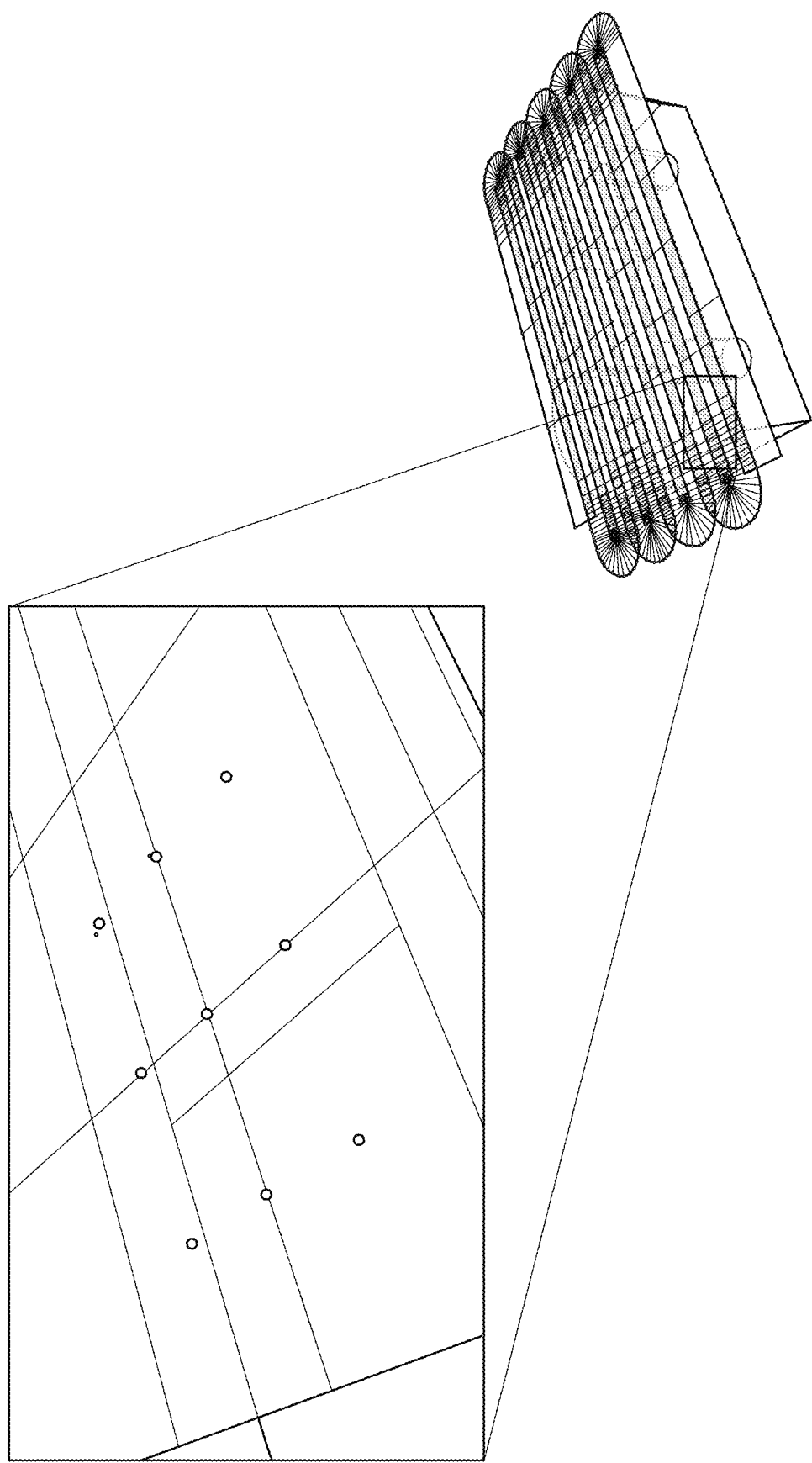
FIG. 9B illustrates a detailed section showing a sweep surface of a tool head and a watertight nominal as-designed CAD model with evaluated points at specific locations on the surface, according to some embodiments.
Figure 10:
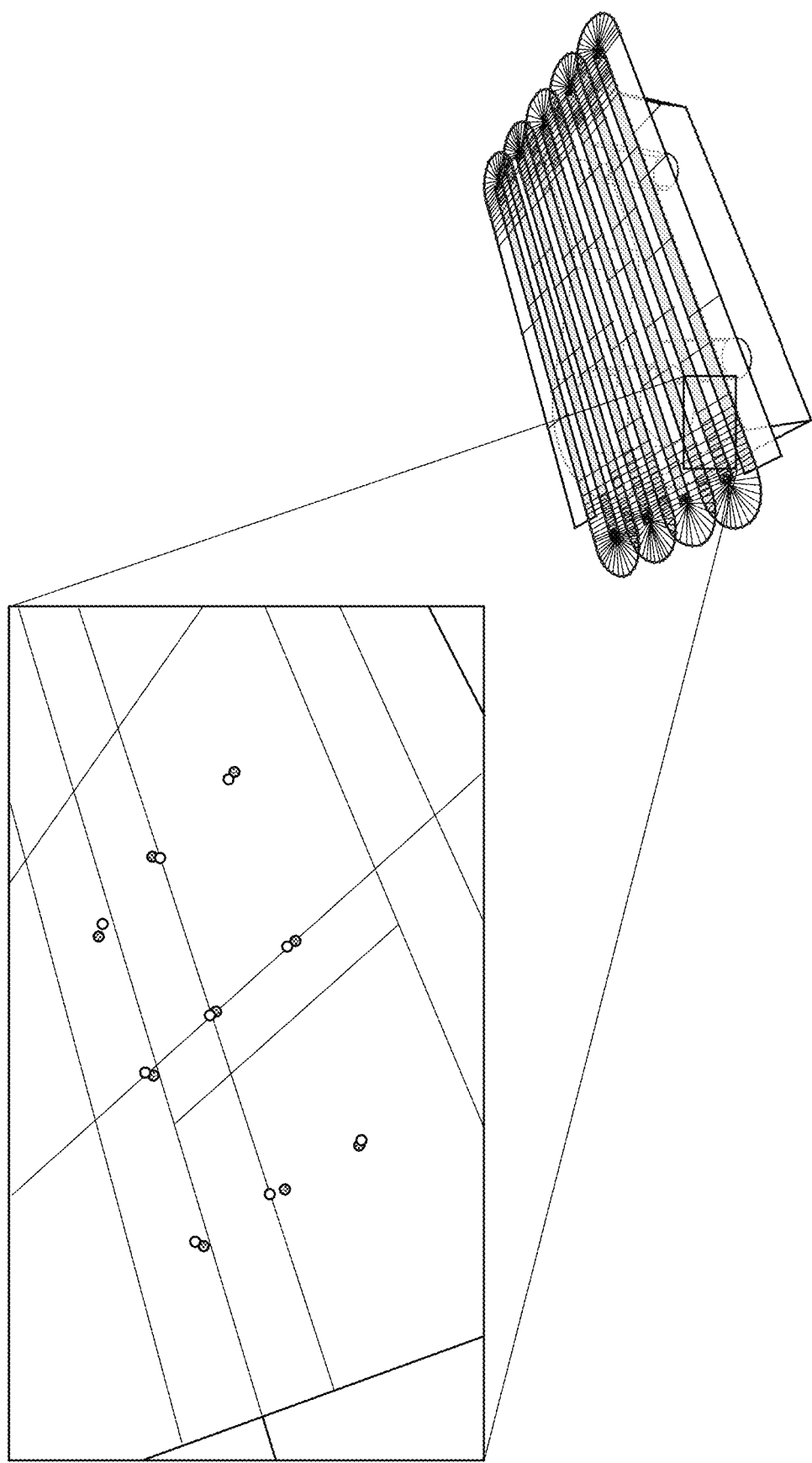
FIG. 10 illustrates a detailed section showing a sweep surface of a tool head and a watertight nominal as-designed CAD model with the closest projected evaluation points, according to some embodiments.
Figure 11:
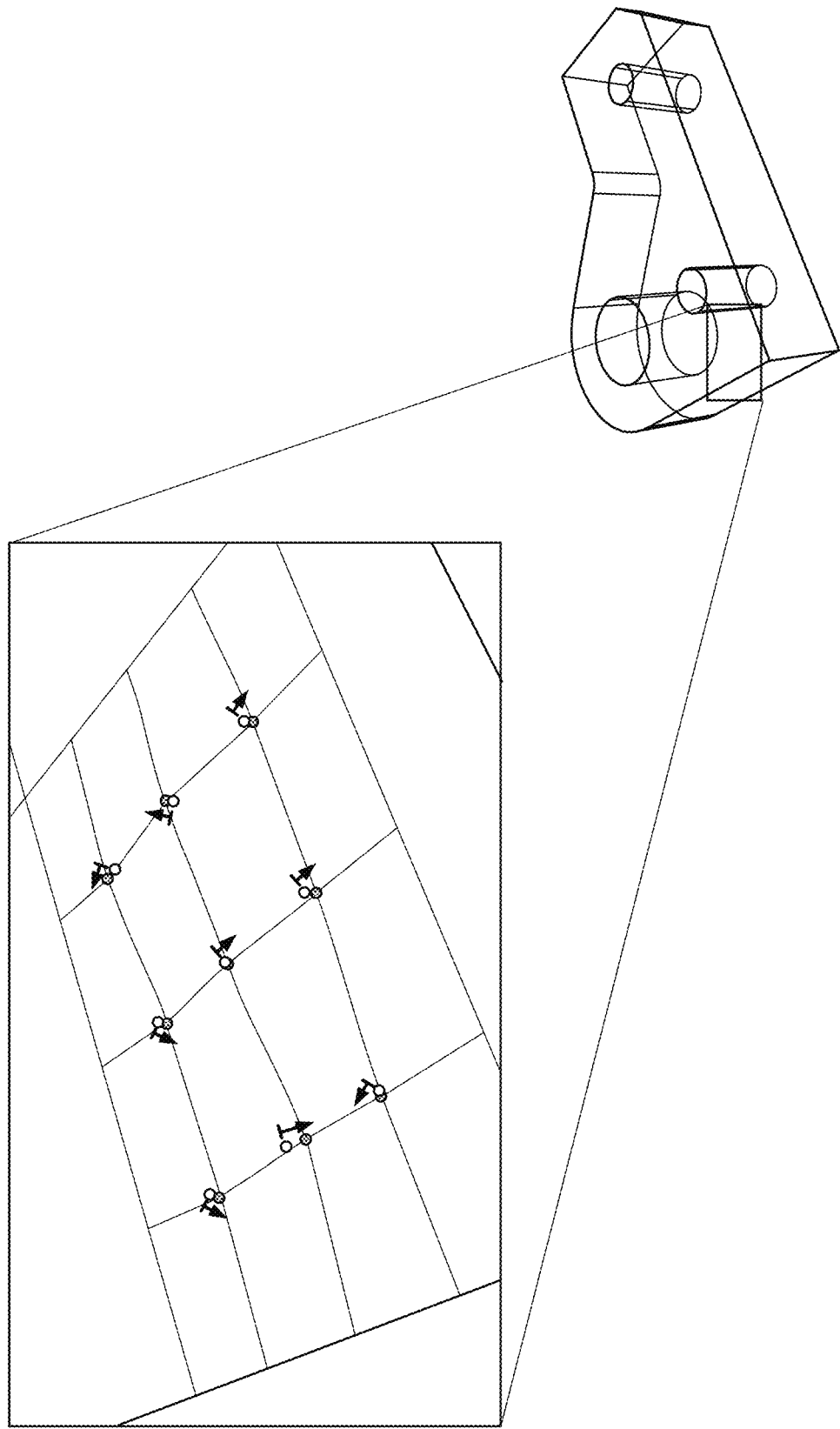
FIG. 11 illustrates a detailed section of a watertight as-executed model as a morphed version of the watertight as-designed CAD model, according to some embodiments.

For illustration purposes, FIG. 9 illustrates a detailed section of an upper surface of a watertight as-designed CAD model, and FIG. 10 illustrates a corresponding detailed section of the sweep surface with nine as-executed points. FIG. 11 shows both the nine sampled model points on the as-designed watertight spline model (indicated by shaded circles) as well as the nine as-executed points on the sweep surface that are nearest to the sampled model points (indicated by open circles).

In some embodiments, the sampled model points may be projected to the nearest as-executed points without explicitly constructing a sweep surface. For example, the geometric model of the manufacturing tool at the set of sweep points can be used to compare discretely sampled points selected from the watertight spline surface to those projected onto a surface or solid model representing the description of the tool. The sequence of sweep point locations at specific times as well as a description of the tool used at those recorded point samples may be used to provide a set of surfaces from which to determine the nearest as-executed point for each sampled CAD model point.

At 210, an as-executed model of the tangible object is constructed based on the point cloud of as-executed points and the as-designed watertight spline model. In some embodiments, the as-executed model is also a watertight spline model. The as-executed model may be constructed further based on metadata associated with the set of points, in some embodiments. Constructing the as-executed model may include performing point projection, point inversion, and a surface morph procedure.

In some embodiments, semantic product manufacturing information (PMI) for the object design is received, and the as-executed model is constructed based at least in part on the semantic PMI. The semantic PMI may be related to one or more of as-designed, as-instructed, and as-executed data. For example, constructing the as-executed model may include determining one or more fit constraints of the tangible object based on the semantic PMI, and interpolating between adjacent points in the point cloud based on the one or more fit constraints. In some embodiments, the fit constraint(s) may be determined based on a sampling density of the point cloud of as-executed points indicated by the semantic PMI. In some embodiments, one or more derivatives or basis function degrees for the as-executed model may be determined using geometric constraints indicated by the semantic PMI, and the control point derivatives may be used to construct the as-executed model.

In some embodiments, constructing the as-executed model of the tangible object includes performing an interpolation or approximation procedure of the plurality of measurement points to the as-designed watertight spline model.

In some embodiments, constructing the as-executed model includes performing an interpolation or approximation procedure utilizing a spline structure of the as-designed watertight spline model to determine a plurality of control points of the as-executed model.

In some embodiments, the as-executed model has the same spline structure as the as-designed watertight spline model. For example, constructing the as-executed model may include performing an interpolation or approximation procedure utilizing the spline structure of the as-designed model to determine a plurality of degrees, control points and knot vectors of the as-executed model. Advantageously, having the same spline structure may facilitate determination of the warp function, by enabling the quantification of differences between the two models.

In some embodiments, after constructing the as-executed model, the as-designed watertight spline model may be modified to have the same spline structure as the as-executed model. For example, the knot vectors of the as-executed model may be compared to the knot vectors of the as-designed model, and knot insertion may be performed on the as-designed model to add any knots that are present in the as-executed model and absent in the as-designed model. Advantageously, this procedure may result in the as-executed and as-designed models having the same spline structure. In other words, they may have the same values for each of the parameters $\{U, V, N_{i,p}(u), N_{i,p}(v)\}$, so that the two models only differ in their respective sets of control points, $\{P_{i,j}{}^w\}$ and $\{\hat{P}_{i,j}{}^w\}$, in homogeneous coordinates, or in their respective sets of control points, $\{P_{i,j}\}$ and $\{\hat{P}_{i,j}\}$, and sets of weights, $\{w_{i,j}\}$ and $\{\hat{w}_{i,j}\}$, in three dimensional Euclidean space. In some cases, the respective weights in sets, $\{w_{i,j}\}$ and $\{\hat{w}_{i,j}\}$, may be set equal such that $w_{i,j}=\hat{w}_{i,j}$, therefore the two models only differ in their respective sets of control points, $\{P_{i,j}\}$ and $\{\hat{P}_{i,j}\}$, in three dimensional Euclidean space. Accordingly, it becomes a straightforward computational procedure to take their difference and obtain the warp function.

At 208, a warp function is determined based on a difference between the as-designed and as-executed models. The warp function may be a continuous function approximating differences between the as-designed model of the object and the object as it was actually manufactured. FIG. 11 illustrates example discrepancy vectors, which illustrate the difference between sample model points of the as-designed model and closest neighboring points of the as-executed model. The discrepancy vectors are illustrated as small arrows, and these vectors may be used to construct the warp function.

In some embodiments, the warp function may be separated into distinct components, each of which may have separate utility in CAx workflows. For example, the warp function $fdW$ may be separated into a warp shape $f$ that is identified as $(\Sigma_{i=0}{}^n \Sigma_{j=0}{}^m R_{i,j}(u, v))$, and a product of the warp distance d and warp direction W that is identified as $(\bar{P}_{i,j} - \hat{P}_{i,j})$. Alternatively, the warp function may be separated such that the product $f \cdot d$ is identified as the function $(\Sigma_{i=0}{}^n \Sigma_{j=0}{}^m R_{i,j}(u, v))$, and the warp direction W is identified as $(\bar{P}_{i,j} - \hat{P}_{i,j})$.

In some embodiments, the measurement points are received and the warp function is determined in real time during the manufacturing process of the physical object. In these embodiments, the manufacturing process may be modified in real-time (i.e., while manufacturing the first object) based at least in part on the warp function. For example, the as-designed watertight spline model may be modified to compensate for one or more errors identified in the warp function. Additionally or alternatively, one or more parameters of the machines used to manufacture the object may be modified based on the warp function. For example, control parameters of a machine tool (position, velocity, etc.) may be modified to compensate for errors indicated by the warp function. In some embodiments, the warp function is useable to modify the manufacturing process to reduce a discrepancy between the object design and a subsequent object produced at a later time through the modified manufacturing process.

In some embodiments, a compensation function is determined based on the warp function and provided to the manufacturing machine to modify parameters used to manufacture the object. The compensation function may describe the inverse of the warp function, such that adding the compensation function to the as-designed model may result in a compensated model that may be used to manufacture an object that is closer to the as-designed model.

In some embodiments, a colorized visual representation of the warp function is displayed on a display. In the displayed warp function, the shading may indicate the discrepancy between the as-designed and the as-inspected model at each point on a portion of the object.

At 210, the warp function is stored in a non-transitory computer-readable memory medium. The warp function may then be accessible for any of a variety of design, metrology, inspection, or manufacturing purposes, as described variously herein.

In some embodiments, the method further includes determining as-planned instructions for an inspection process of the tangible object based at least in part on metadata of the as-designed watertight spline model and the warp function. The as-planned instructions may be described in a Computer-Aided Inspection (CAI) model domain. The inspection process may be performed on the tangible object according to the as-planned instructions to produce as-inspected data, and the as-inspected data may be stored in the non-transitory computer-readable memory medium.

In some embodiments, the set of sweep points are as-executed data for the manufacturing tool. The method may further include receiving as-instructed data for the manufacturing tool to manufacture the tangible object, and determining a univariate warp function based on a difference between the as-instructed data and the as-executed data. The univariate warp function may be stored in the non-transitory computer-readable memory medium.

Additional Description

The following numbered paragraphs provide additional technical description related to the described embodiments.
Description of Watertight Spline Morphing Functionality CAD model morphing procedures may utilize curve and surface warping. A warping function, for example, may deform a curve segment or surface region logically by control point repositioning. The warping function may define the control point repositioning as the original control point location and a deviation vector, and is often described by several complementary components (e.g., warp shape, warp distance, warp direction, etc.). Shape operators are a subset of shape modifications that may be used to alter local segments or regions on curves and surfaces. The functions may directly modify associated control points to a desired behavior.

A general framework for utilizing shape operators may proceed by first specifying a local curve segment or surface region for an existing curve or surface, within which the shape modification is to occur. Knot refinement may then be used to introduce more control points locally. Control points whose influence is local to the specified segment or region may then be repositioned according to various parameters and/or functions. Finally, knot removal to within a specified tolerance may be applied to the local segment or region in order to reduce the number of defining control points.

The moving of original control points is referred to herein as control point repositioning. When shape modification functions are applied to the original control points, they may be repositioned to reflect the desired curve segment or surface region behavior. Warping is one particular manner of applying control point repositioning. Analytic surface representations in CAD (e.g., cylinders, spheres, etc.) may not admit such shape modification, as their shape is controlled by a limited number of fixed geometric attributes constrained to a limited number of specific geometric forms. However, such representations can generally be recast as rational spline representations (exactly, in the case of quadratic surfaces).

In contrast to standard warping functions, morphing methods associated with described embodiments start with the parametric structure (i.e., spline data in the form of degree, knot vector, etc.) from the existing watertight spline representation along with points to interpolate or approximate (e.g., least-squares fit) that were obtained during the manufacturing process. Interpolation and/or approximation algorithms may be used to provide a morphed representation by defining the repositioned control points of the watertight spline representation. The warp function may then be recast to back-calculate (e.g., back solve) for the deviation vector to establish the relationship between the geometry of the as-designed model (e.g., either a native CAD model or a geometrically watertight spline model) and the morphed as-executed manufacturing model. Advantageously, output as defined by the warp algorithm (the repositioned control points) may be used to determine the update function (deviation vectors and complementary components) that may be used as input when utilizing the warp function in a standard manner. In other words, because the constructed warp function is described as a spline model that is commensurate with the as-designed geometrically watertight spline model, the warp function may be useable to modify and improve the manufacturing process in a more streamlined manner, as deviations from the as-designed model indicated by the warp function are described in a model language that is directly relatable to the original as-designed model. This may be based on an assumed relationship between the control points a priori via a watertight spline representation.

Performance of the above-described methodology may depend on the point density of the as-executed sampling data, as it establishes the form of the morphed representation through interpolation/approximation. In general, the greater number of points collected during manufacturing, the higher the confidence in the accuracy of the morph model description to the as-built part (e.g., assuming a uniform precision in the data).

In contrast to the limited geometric description provided in a model described by analytic surface representations in CAD (e.g., cylinders, spheres, etc.), shape control of a CAD model represented by splines allows for modification of the geometric form by utilizing warping and shape modifiers. Advantageously, the model description may enable more adaptable, precise, and accurate characterizations of the warp function.

In some embodiments, the quality of the morph methodology (e.g., the accuracy of the warp function) may be improved without necessarily increasing the as-executed sampling point density by utilizing semantic PMI. The semantic PMI may be directly associated with the CAD design model, or alternatively it may be added during the manufacturing process. As described above, this semantic PMI data is not necessary to perform the morphing procedure, as point data from the manufacturing process may be interpolated without using semantic PMI to constrain the interpolation. However, utilizing semantic PMI may augment the method by providing a well-informed path for the interpolation or approximation of features and/or characteristics that are under manufacturing scrutiny. Assumptions on the admissible shape and form of the morphed data may be made based on shape control and constraints interpreted from the available semantic PMI.

Accordingly, as-executed sampling point densities at these features or characteristics may be optimized utilizing auxiliary data in the form of semantic PMI. More generally, the semantic PMI may be used to constrain the interpolation more accurately between adjacent as-executed points. For example, the semantic PMI may indicate a curvature of a surface along a particular direction, and interpolation constraints may be derived based on the semantic PMI to interpolate between as-executed points in a way that incorporates the indicated curvature (e.g., instead of a linear interpolation).

Embodiments herein, with or without utilizing semantic PMI as an additional input, may provide many advantages to the user. As one example, a relationship is created (i.e., digital twin) between the CAD design model and the morphed, as-executed manufacturing model. Because the CAD model is directly modified in this operation from the input data, the laborious process of generating a mesh, tessellation, or other intermediate geometric modeling representation based on manufacturing data may be avoided. Further, the relationship created between the design and morphed manufacturing models (as-instructed and/or as-executed) via embodiments described herein may provide a means of maintaining semantic PMI data throughout the design-manufacturing-inspection lifecycle. In addition, the interpretation of manufacturing data in the manufacturing process plan (i.e., as-instructed data) is standardized, and the as-executed manufacturing model has a traceable, known, mathematically founded relationship to the CAD design model, unlike the tessellated or meshed models which are only related in the sense that they are both representations of the same object, but share no common pedigree or associativity.

Figure 12:
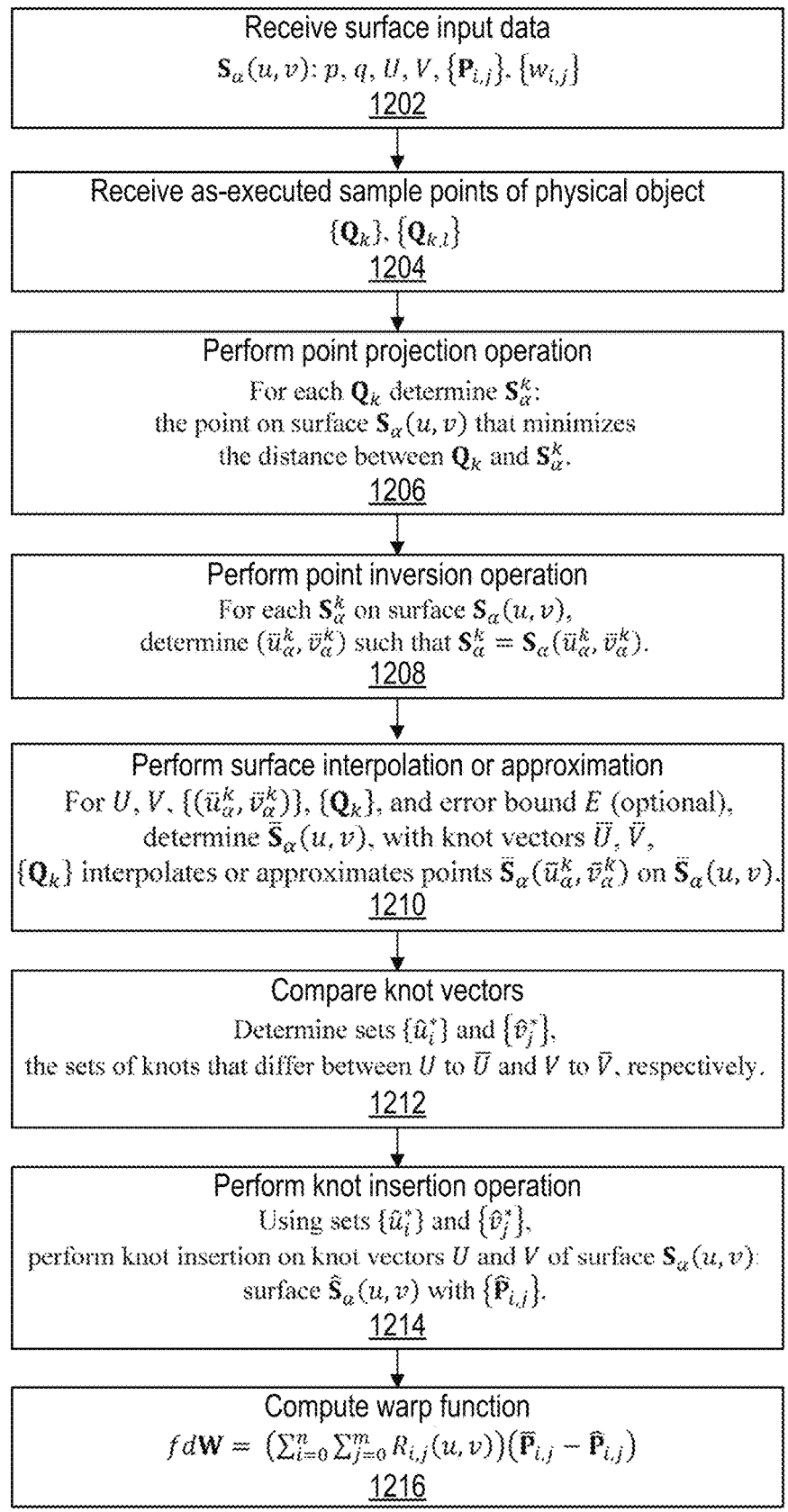
FIG. 12 illustrates a method for determining a warp function without utilizing semantic PMI, according to some embodiments.

FIG. 12—Determining Warp Function Without Semantic PMI

FIG. 12 illustrates a method for determining a warp function without utilizing semantic PMI, which provides additional specific mathematical detail compared to the method shown in FIG. 2. The methods shown in FIG. 12 share some aspects with the methods described in reference to FIG. 2 (e.g., starting at step 208 of FIG. 2). In some embodiments, a method for determining a warp function without utilizing semantic PMI may proceed as described in the following steps:

At 1202, input data is received in the form of a watertight spline model and a point cloud data set. The watertight spline model may correspond to the "first" watertight spline model described in reference to FIG. 2, and the point cloud data set may correspond to a set of as-executed sample points along a sweep trajectory of a manufacturing tool. Each surface patch, $S_\alpha(u, v) = \Sigma_{i=0}^{n} \Sigma_{j=0}^{m} R_{i,j}(u, v) P_{i,j}$, in the watertight spline model may contain complete information in defining the surface for that surface domain $[u_0, u_{n+p+1}] \times [v_0, v_{m+q+1}]$, where:

$U = \{u_0, \ldots, u_i, \ldots, u_{n+p+1}\}$ is the knot vector in the parametric u-direction, $V = \{v_0, \ldots, v_j, \ldots, v_{m+q+1}\}$ is the knot vector in the parametric v-direction, $\{N_{i,p}(u)\}$ is the set of i-th B-spline basis functions of degree p, $\{N_{j,q}(u)\}$ is the set of j-th B-spline basis functions of degree q, $\{P_{i,j}\}$ is the set of (i, j) control points forming an $[n+1] \times [m+1]$ bidirectional control net, $\{w_{i,j}\}$ is the set of (i, j) weights corresponding to the control points, and $\{R_{i,j}(u, v) = (N_{i,p}(u) N_{j,q}(v) w_{i,j}) / (\Sigma_{k=0}^{n} \Sigma_{l=0}^{m} N_{k,p}(u) N_{l,q}(v) w_{k,l})\}$ is the set of rational basis functions.

At 1204, a point cloud data set is received, which may be as-executed sampling points along a sweep trajectory of a manufacturing tool from the manufacture of a physical object, in some embodiments. In various embodiments, the point cloud data may be a set of points associated with the surface as either:

$\{Q_k\}$ a set of unordered points, or $\{Q_{k,l}\}$ a set of points ordered bidirectionally.

At 1206, for each point in the set of point cloud data $Q_k$, a point projection operation is performed. For each $Q_k$, $S_\alpha^k$ is determined defined as the point on surface $S_\alpha(u, v)$ that minimizes the distance between $Q_k$ and $S_\alpha^k$. A variety of types of point projection operations may be used, as desired.

At 1208, for each projected point $S_\alpha^k$ a point inversion operation is performed. For each $S_\alpha^k$ on the surface $S_\alpha(u, v)$, the corresponding parameters $(\bar{u}_\alpha^k, \bar{v}_\alpha^k)$ are determined such that $S_\alpha^k = S_\alpha(\bar{u}_\alpha^k, \bar{v}_\alpha^k)$. The point inversion operation may be performed according to any of a variety of methodologies, as desired.

At 1210, for U, V, $\{(\bar{u}_\alpha^k, \bar{v}_\alpha^k)\}$, $\{Q_k\}$, and error bound E (optional), an interpolation or approximation surface operation is performed to determine $\bar{S}_\alpha(u, v)$, the surface morph that interpolates or approximates the point cloud data $\{Q_k\}$ at points $\bar{S}_\alpha(\bar{u}_\alpha^k, \bar{v}_\alpha^k)$ on $\bar{S}_\alpha(u, v)$. This surface, $\bar{S}_\alpha(u, v)$, is defined by knot vectors $\bar{U}$, $\bar{V}$, produced by the interpolation or approximation surface algorithm, and represents the as-executed surface. The surface morph may correspond to the second watertight spline model or the as-executed manufacturing model described in reference to FIG. 2. Note that in some embodiments, step 210 of FIG. 2 (constructing the as-executed model) may include each of steps 1206-1210 described here.

At 1212, knot vectors are compared (U compared to $\bar{U}$ and V compared to $\bar{V}$) to determine sets $\{\hat{u}_i^*\}$ and $\{\hat{v}_j^*\}$, where $\{\hat{u}_i^*\}$ and $\{\hat{v}_j^*\}$ are the sets of knots that differ between U to $\bar{U}$ and V to $\bar{V}$, respectively.

At 1214, knot insertion is performed on knot vectors U and V of surface $S_\alpha(u, v)$ using sets $\{\hat{u}_i^*\}$ and $\{\hat{v}_j^*\}$, respectively. This produces surface $\hat{S}_\alpha(u, v)$ with $\{\hat{P}_{i,j}\}$.

At 1216, the warp function is determined using a region warping algorithm, $\bar{P}_{i,j} = \hat{P}_{i,j} + f dW$, where:

$f$ is a function defined as the warp shape, d is a constant defined as the warp distance, W is a vector defined as the warp direction, and $f dW$ is a function defined as the warp function.

Given $\{\bar{P}_{i,j}\}$ and $\{\hat{P}_{i,j}\}$ determine the warp function, $f dW = \bar{P}_{i,j} - \hat{P}_{i,j}$.

Given that $\bar{S}_\alpha(u, v)$ and $\hat{S}_\alpha(u, v)$ have the same degrees, knot vectors, and basis functions, the difference may be taken defined, as $\bar{S}_\alpha(u, v) - \hat{S}_\alpha(u, v) = (\Sigma_{i=0}^{n} \Sigma_{j=0}^{m} R_{i,j}(u, v) \bar{P}_{i,j}) - (\Sigma_{i=0}^{n} \Sigma_{j=0}^{m} R_{i,j}(u, v) \hat{P}_{i,j}) = (\Sigma_{i=0}^{n} \Sigma_{j=0}^{m} R_{i,j}(u, v))(\bar{P}_{i,j} - \hat{P}_{i,j})$.

Due to the manner of construction above, the difference in surfaces is the warp between the surfaces such that $\bar{S}_\alpha(u, v) - \hat{S}_\alpha(u, v) = f dW$.

Equating the expressions for the difference in surfaces, we obtain the warp function in the applicable form $f dW = (\Sigma_{i=0}^{n} \Sigma_{j=0}^{m} R_{i,j}(u, v))(\bar{P}_{i,j} - \hat{P}_{i,j})$, in which the decomposition of the warp function's components may be made in various ways.

Note that the above description is defined specifically in three-dimensional Euclidean space, i.e., in terms of $S_\alpha(u, v)$, $\{P_{i,j}\}$, $\{w_{i,j}\}$, etc. Without loss of generality, a similar description can be made with minor adjustment for a description defined in homogeneous coordinates, i.e., in terms of $S_\alpha^w(u, v)$, $\{P_{i,j}^w\}$, etc. The transformation between three-dimensional space and homogeneous coordinates is well-defined and well-understood in the areas of spline functions, Computer-Aided geometric design, and geometric modelling.

Figure 13:
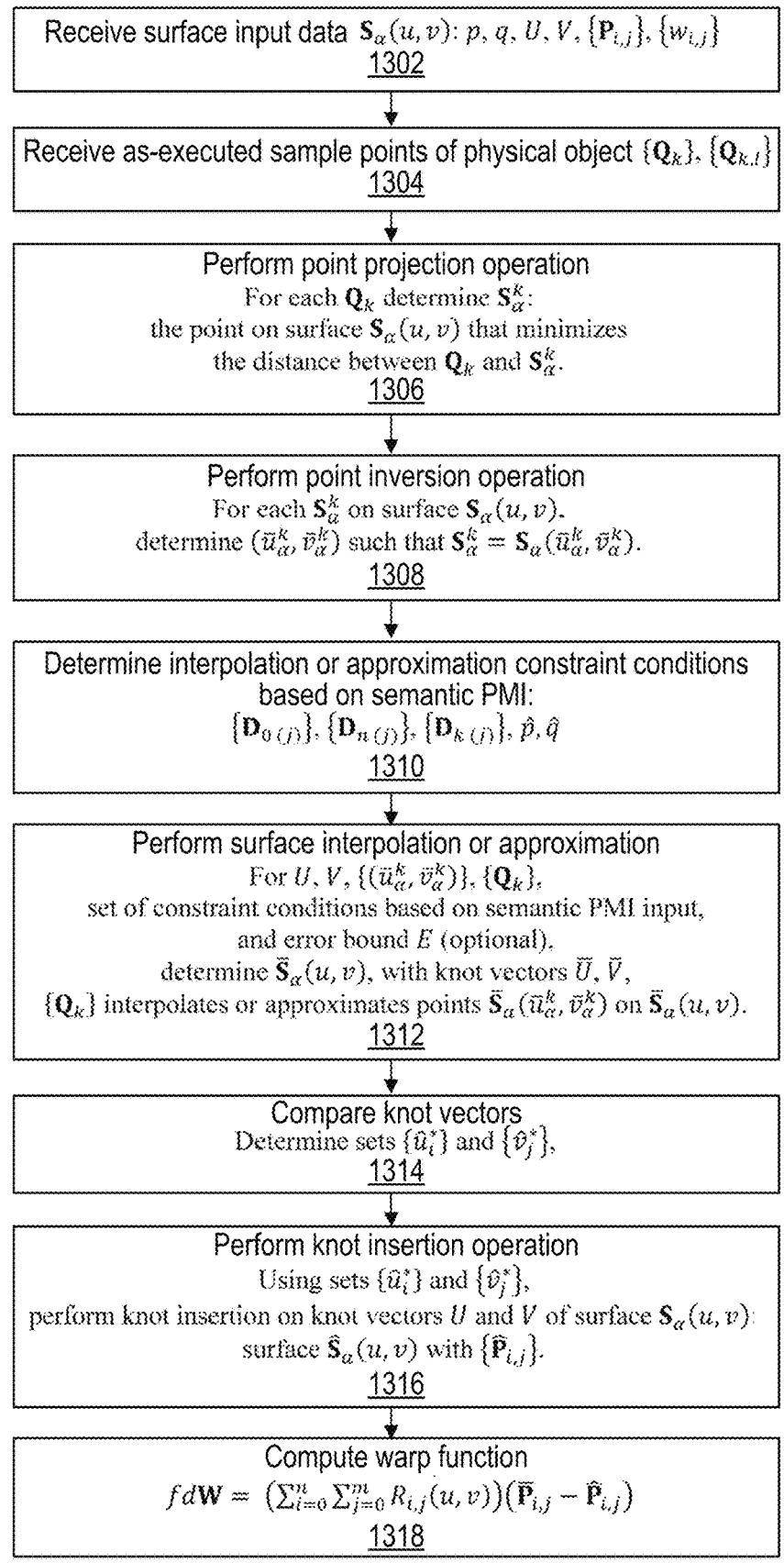
FIG. 13 illustrates a method for determining a warp function that utilizes semantic PMI, according to some embodiments.

FIG. 13—Determining Warp Function With Semantic PMI

FIG. 13 illustrates a method for determining a warp function that utilizes semantic PMI, and provides additional specific mathematical detail compared to the method shown in FIG. 2. The methods described in FIG. 13 share some aspects with the methods described in reference to FIG. 2 (e.g., starting at step 208 of FIG. 2). In some embodiments, a method for determining a warp function while utilizing semantic PMI may proceed as described in the following steps:

At 1302, input data is received in the form of a watertight spline model and a point cloud data set. The watertight spline model may correspond to the "first" watertight spline model described in reference to FIG. 2, and the point cloud data set may correspond to a set of as-executed sample points along a sweep trajectory of a manufacturing tool and the associated metadata. Each surface patch, $S_\alpha(u, v) = \Sigma_{i=0}^{n} \Sigma_{j=0}^{m} R_{i,j}(u, v) P_{i,j}$, in the watertight spline model may contain complete information in defining the surface for that surface domain $[u_0, u_{n+p+1}] \times [v_0, v_{m+q+1}]$:

$U = \{u_0, \ldots, u_i, \ldots, u_{n+p+1}\}$ is the knot vector in the parametric u-direction, $V = \{v_0, \ldots, v_j, \ldots, v_{m+q+1}\}$ is the knot vector in the parametric v-direction, $\{N_{i,p}(u)\}$ is the set of i-th B-spline basis functions of degree p, $\{N_{j,q}(u)\}$ is the set of j-th B-spline basis functions of degree q, $\{P_{i,j}\}$ is the set of (i, j) control points forming an [n+1]×[m+1] bidirectional control net, $\{w_{i,j}\}$ is the set of (i, j) weights corresponding to the control points, and $\{R_{i,j}(u, v)=(N_{i,p}(u)N_{j,q}(v)w_{i,j})/(\Sigma_{k=0}{}^n\Sigma_{l=0}{}^m N_{k,p}(u)N_{l,q}(v)w_{k,l})\}$ is the set of rational basis functions.

At 1304, a point cloud data set is received, which may include as-executed sampling points along a sweep trajectory of a manufacturing tool from the manufacture of a physical object, in some embodiments. The point cloud data is assumed to be a set of points associated to the surface as either:

$\{Q_k\}$ a set of unordered points, or $\{Q_{k,l}\}$ a set of points ordered bidirectionally.

At 1306, for each point in the set of point cloud data $Q_k$ a point projection operation is performed, that is, for each $Q_k$ determine $S_\alpha{}^k$ defined as the point on surface $S_\alpha(u, v)$ that minimizes the distance between $Q_k$ and $S_\alpha{}^k$.

At 1308, for each projected point $S_\alpha{}^k$ a point inversion operation is performed. For each $S_\alpha{}^k$ on surface $S_\alpha(u, v)$, the corresponding parameters $(\bar{u}_\alpha{}^k, \bar{v}_\alpha{}^k)$ are determined such that $S_\alpha{}^k = S_\alpha(\bar{u}_\alpha{}^k, \bar{v}_\alpha{}^k)$.

At 1310, surface interpolation or approximation constraint conditions are determined based on the semantic PMI. Based on the specific feature associated with surface patch $S_\alpha(u, v)$ from semantic PMI or other metadata inputs on geometric form (e.g., cylindricity, planarity, sphericity, etc.), one or more of the following interpolation or approximation constraint conditions (i.e., fit parameters, continuity conditions, end conditions, specified degrees, etc.) may be determined from the feature classification:

$\{D_{0\ (j)}\}$ a set of j-th derivative vectors at the start of the surface, $\{D_{n\ (j)}\}$ a set of j-th derivative vectors at the end of the surface, $\{D_{k\ (j)}\}$ a set of j-th derivative vectors corresponding to each point in $\{Q_k\}$, and $\hat{p}, \hat{q}$ specified surface degrees in the i-th and j-th directions, respectively.

At 1312, using U, V, $\{(\bar{u}_\alpha{}^k, \bar{v}_\alpha{}^k)\}$, $\{Q_k\}$, the set of constraint conditions based on semantic PMI input, and error bound E (optional), an interpolation or approximation surface operation is performed to determine $\bar{S}_\alpha(u, v)$, the surface morph that interpolates or approximates the point cloud data $\{Q_k\}$ at points $\bar{S}_\alpha(\bar{u}_\alpha{}^k, \bar{v}_\alpha{}^k)$ on $\bar{S}_\alpha(u, v)$. This surface, $\bar{S}_\alpha(u, v)$, is defined by knot vectors $\bar{U}, \bar{V}$, produced by the interpolation or approximation surface algorithm, and represents the as-executed surface. The surface morph may correspond to the second watertight spline model or the as-executed manufacturing model described in reference to FIG. 2. Note that in some embodiments, step 210 of FIG. 2 (constructing the as-executed model) may include each of steps 1306-1312 described here.

At 1314, the knot vectors are compared (U compared to $\bar{U}$ and V compared to $\bar{V}$) to determine sets $\{\hat{u}_i^*\}$ and $\{\hat{v}_j^*\}$, which are the sets of knots that differ between U to $\bar{U}$ and V to $\bar{V}$, respectively.

At 1316, knot insertion is performed on knot vectors U and V of surface $S_\alpha(u, v)$ using sets $\{\hat{u}_i^*\}$ and $\{\hat{v}_j^*\}$, respectively. This produces surface $\hat{S}_\alpha(u, v)$ with $\{\hat{P}_{i,j}\}$.

At 1318, the region warping algorithm is utilized to determine the warp function, $\bar{P}_{i,j} = \hat{P}_{i,j} + fdW$, where:

$f$ is a function defined as the warp shape, d is a constant defined as the warp distance, and W is a vector defined as the warp direction, and $fdW$ is a function defined as the warp function.

Given $\{\bar{P}_{i,j}\}$ and $\{\hat{P}_{i,j}\}$ determine the warp function, $fdW = \bar{P}_{i,j} - \hat{P}_{i,j}$.

Given that $\bar{S}_\alpha(u, v)$ and $\hat{S}_\alpha(u, v)$ have the same degrees, knot vectors, and basis functions, the difference can be taken defined as $\bar{S}_\alpha(u, v) - \hat{S}_\alpha(u, v) = (\Sigma_{i=0}{}^n\Sigma_{j=0}{}^m R_{i,j}(u, v)\bar{P}_{i,j}) - (\Sigma_{i=0}{}^n\Sigma_{j=0}{}^m R_{i,j}(u, v)\hat{P}_{i,j}) = (\Sigma_{i=0}{}^n\Sigma_{j=0}{}^m R_{i,j}(u, v))(\bar{P}_{i,j} - \hat{P}_{i,j})$.

Due to the manner of construction above, we assert that the difference in surfaces is the warp between the surfaces such that $\bar{S}_\alpha(u, v) - \hat{S}_\alpha(u, v) = fdW$.

Equating the expressions for the difference in surfaces, we obtain the warp function in the applicable form $fdW = (\Sigma_{i=0}{}^n\Sigma_{j=0}{}^m R_{i,j}(u, v))(\bar{P}_{i,j} - \hat{P}_{i,j})$, in which the decomposition of the warp function's components may be made in various ways.

Note that the above description is defined specifically in three-dimensional Euclidean space, i.e., in terms of $S_\alpha(u, v)$, $\{P_{i,j}\}$, $\{w_{i,j}\}$, etc. Without loss of generality, a similar description can be made with minor adjustment for a description defined in homogeneous coordinates, i.e., in terms of $S_\alpha{}^w(u, v)$, $\{P_{i,j}{}^w\}$, etc. The transformation between three-dimensional space and homogeneous coordinates is well-defined and well-understood in the area of spline functions, Computer-Aided geometric design, and geometric modelling.

Figure 14:
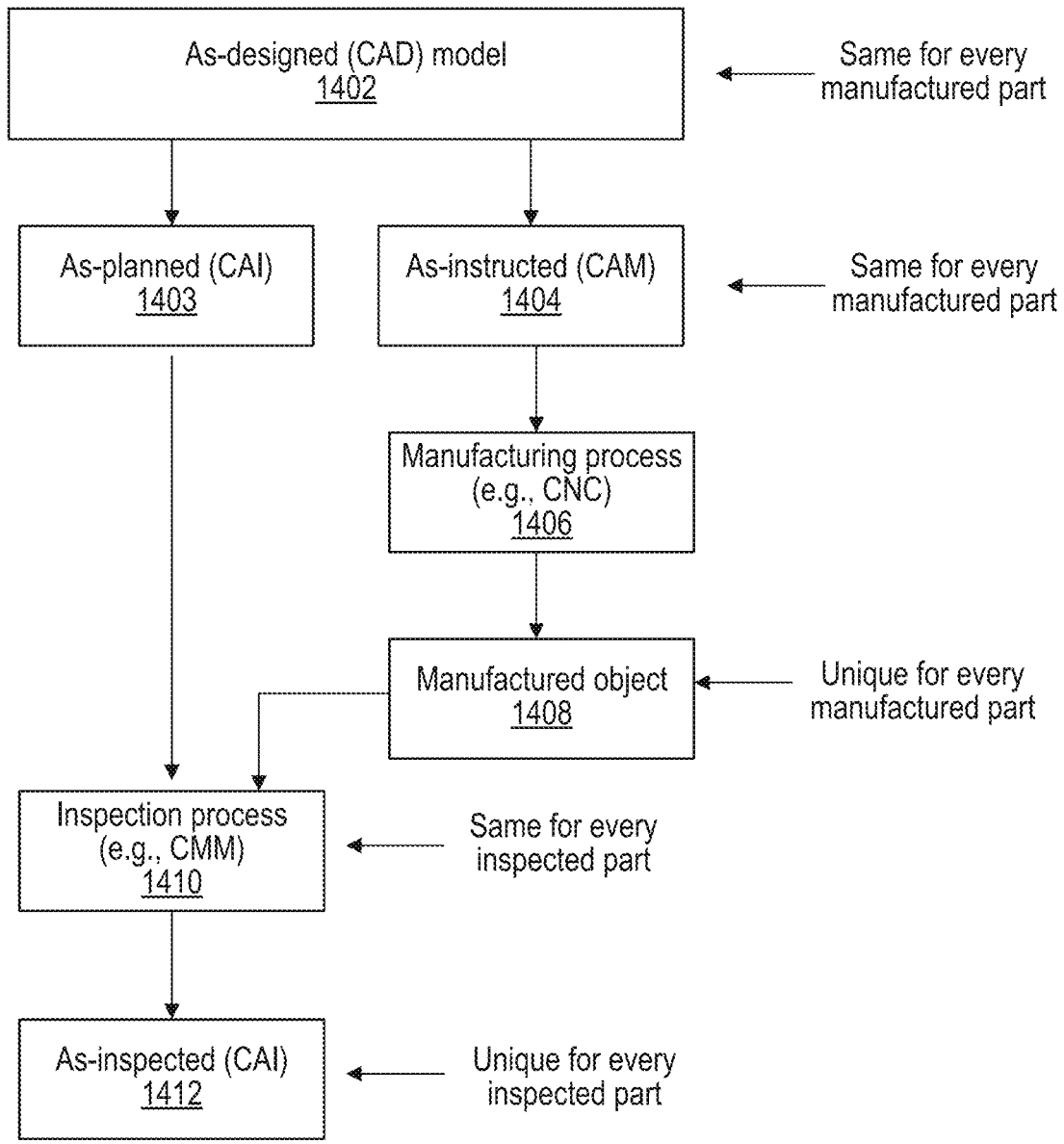
FIG. 14 illustrates an as-designed to as-inspected model workflow without using as-executed data, according to some embodiments.
Figure 15:
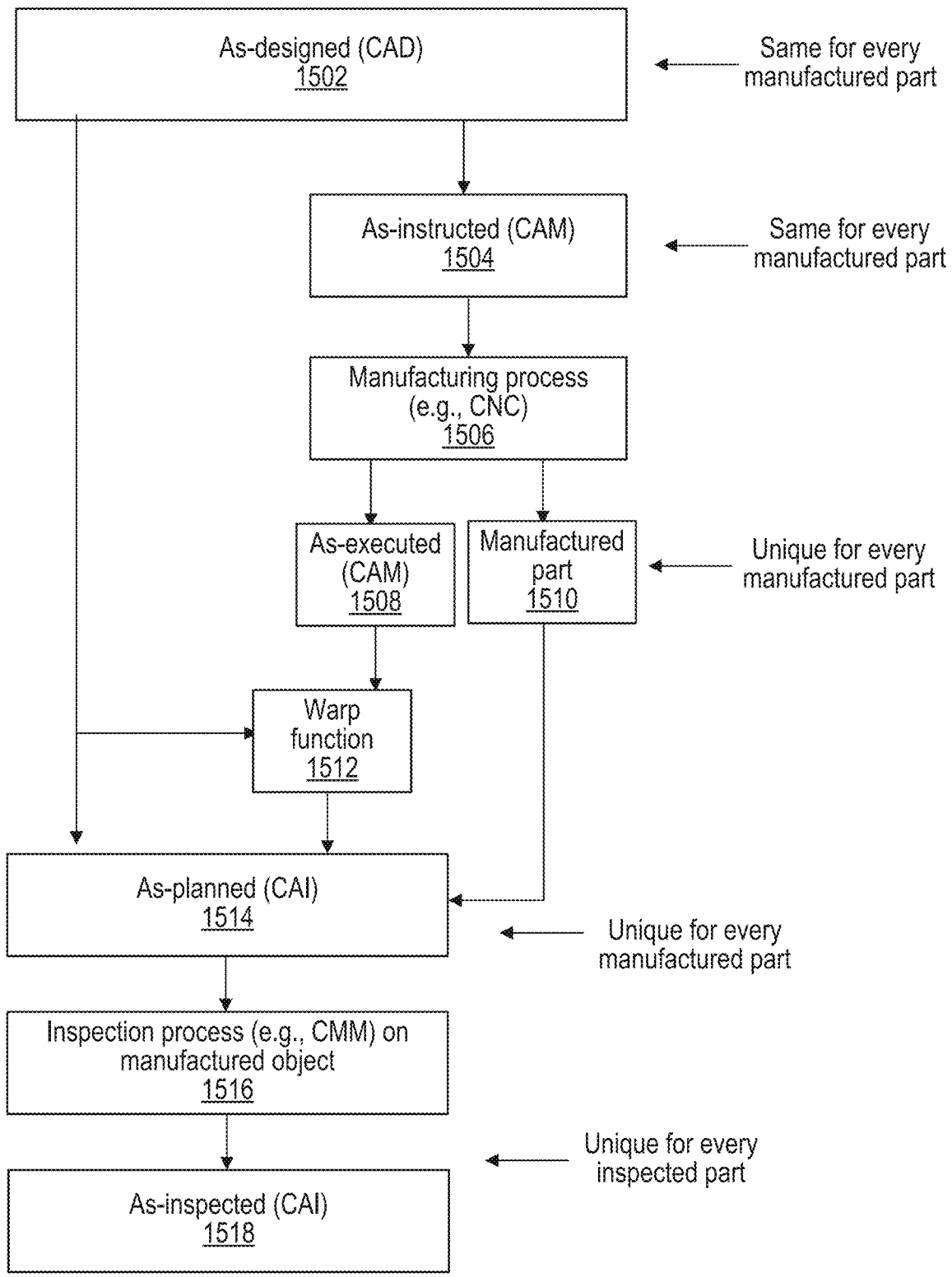
FIG. 15 illustrates an as-designed to as-inspected model workflow that utilizes as-executed data, according to some embodiments.
Figure 16:
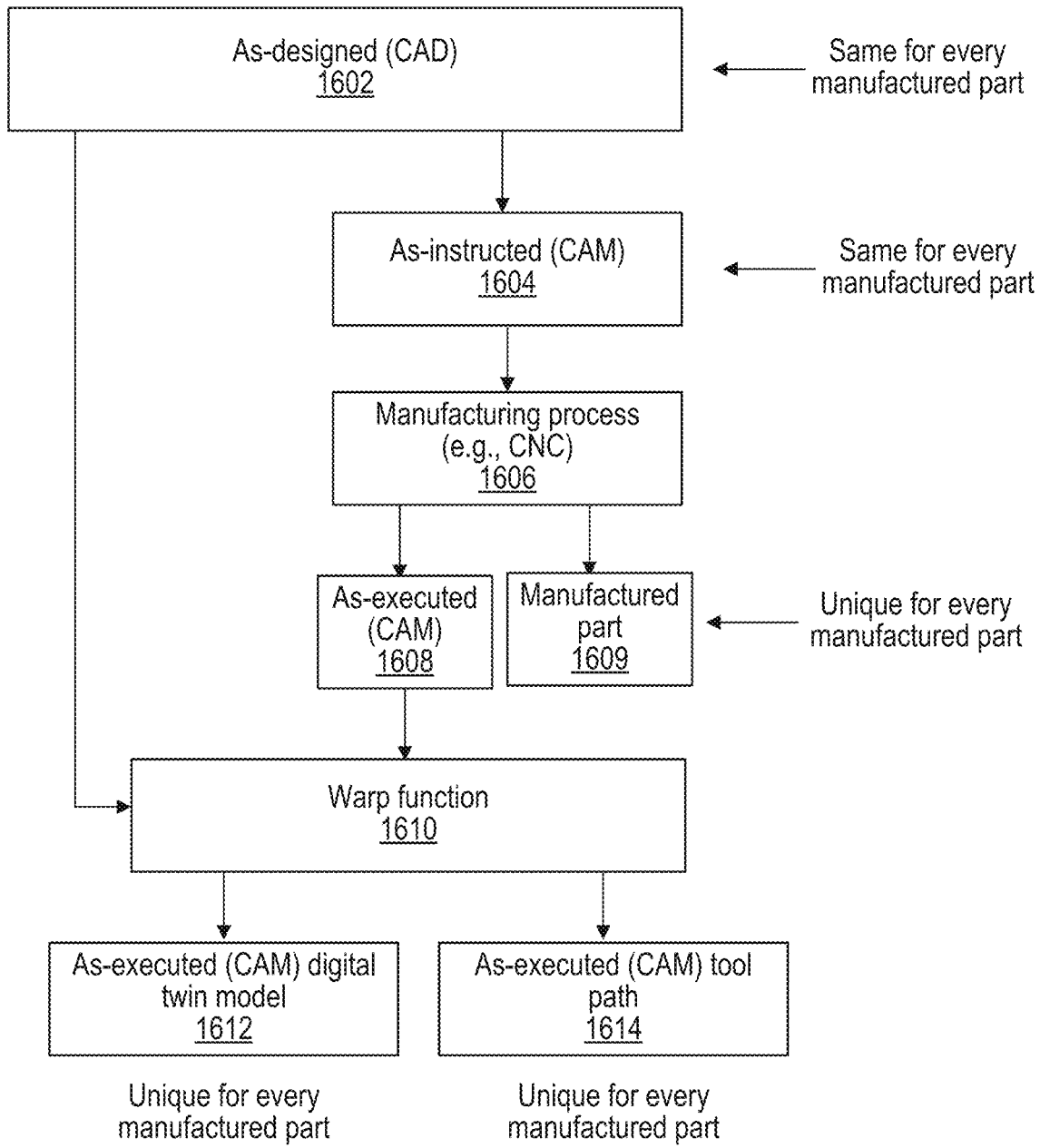
FIG. 16 illustrates a model workflow that utilizes as-executed data to construct a CAM digital twin and a tool path, according to some embodiments.

FIGS. 14-16—Using As-Executed Data to Improve CAI Processes

FIG. 14 illustrates an as-designed to as-inspected workflow without using as-executed data, and FIGS. 15-16 illustrate methods where as-executed data is used to improve workflows for Computer-Aided Inspection (CAI) and other processes. In the workflow shown in FIG. 14, an as-designed CAD model 1402 of the nominal (idealized) object design is used to construct both as-planned CAI instructions 1403 for an inspection process and as-instructed CAM instructions 1404 to a manufacturing tool for manufacturing the object. The as-designed CAD model includes both the geometric model and PMI (e.g., design requirements such as GD&T, material, etc.). The as-planned CAI instructions may include both an inspection probe path and associated PMI (e.g., features, characteristics, etc.). The as-instructed CAM instructions may include tool path instructions and/or PMI (e.g., feed rate, torque, etc.).

The physical object is manufactured, and the inspection process occurs (e.g., CMM or another inspection method) on the physical object using the as-planned CAI instructions. The inspection process is the same for each manufactured part inspected. Note that metadata from the CAD model may be used to determine the as-planned CAI instructions, e.g., such as tolerance and/or geometry and design requirements (e.g., GD&T). Finally, the result of the inspection process may be stored as as-inspected CAI data 1412, which is unique to each inspected part.

FIG. 15 illustrates an improved workflow that utilizes as-executed data to inform the inspection process. The as-executed data (which may differ from the as-instructed data) may be used to enhance the inspection by providing the currently missing part-specific manufacturing data as an input to the inspection planning process. In current implementations, inspection planning is solely determined by the nominal CAD geometry and PMI (e.g., GD&T), making every part inspection program identical. Knowledge of the unique part-specific as-executed manufacturing information provides a second input stream that may aid in identifying possible deviations from nominal geometry and PMI (e.g., GD&T), which may be utilized to individualize part inspection plans. Said another way, the as-planned CAI instructions that direct the inspection process may be determined based on both the as-designed CAD model and the as-executed CAM data that describes the locations of the manufacturing tool and metadata associated with the manufacturing process (e.g. feed rate, torque, or other parameters) at a sequence of points in time.

Note that manufacturing tools typically operate within some known variance in precision, so that the as-executed locations of the tool head may differ from the as-instructed locations of the tool head. The machine controller may store the as-executed data, and the particular discrepancies between the as-instructed and as-executed data may be used to customize the inspection process for the particular as-manufactured object. In some embodiments, a warp function is determined that describes differences between the as-designed CAD model and an as-executed model of the manufactured object, and the warp function may be used to determine the as-planned CAI instructions. The as-executed model may be analyzed either before or during the as-planned inspection program process for specific attributes that contribute to the part-specific inspection plan.

FIG. 16 is similar in some aspects to FIG. 15, but illustrates a method where the derived warp function may be utilized to construct an as-executed CAM digital twin model 1612 or an as-executed CAM tool path.

Figure 17:
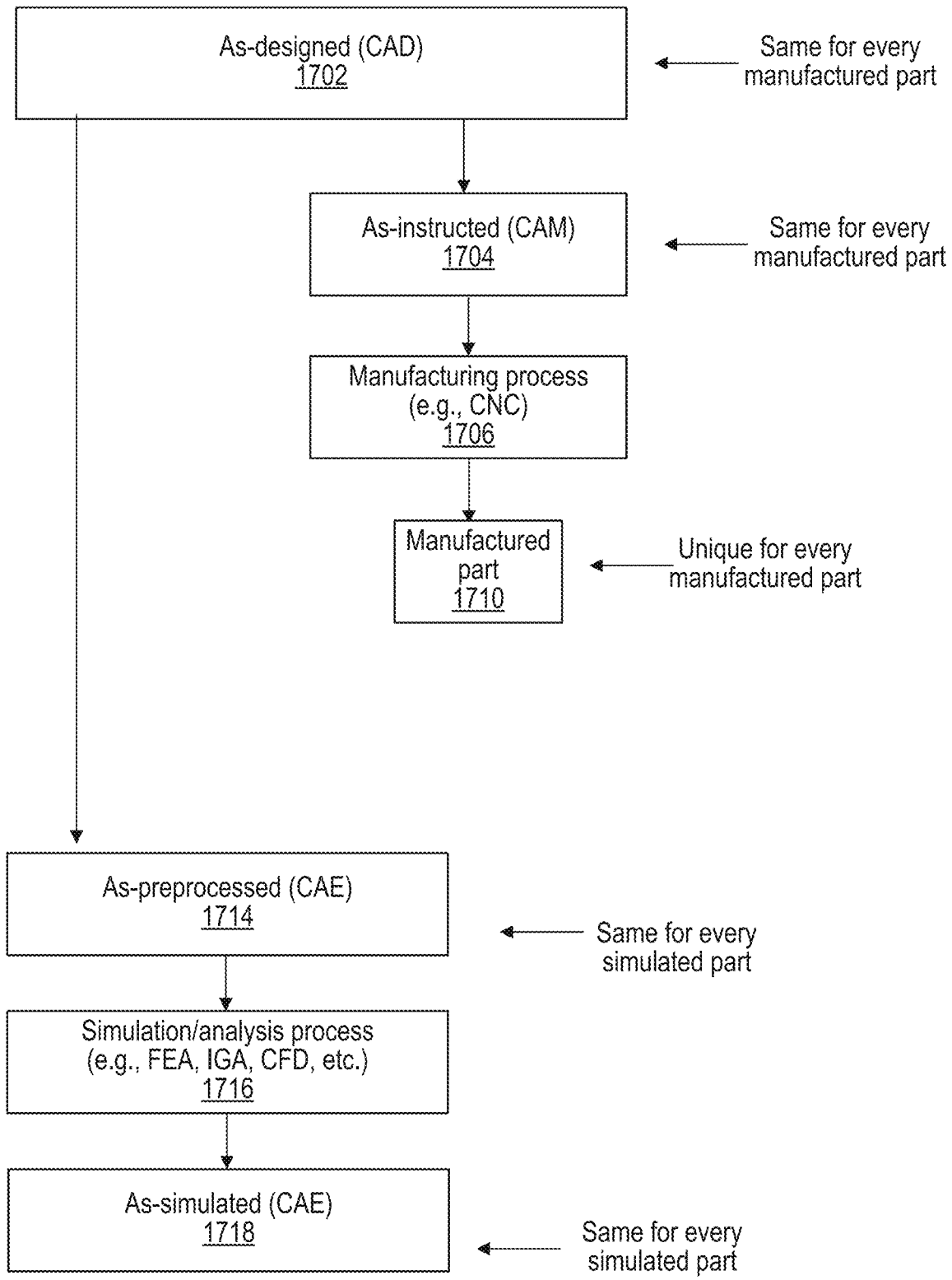
FIG. 17 illustrates an as-designed to as-simulated model workflow without utilizing as-executed data, according to some embodiments.
Figure 18:
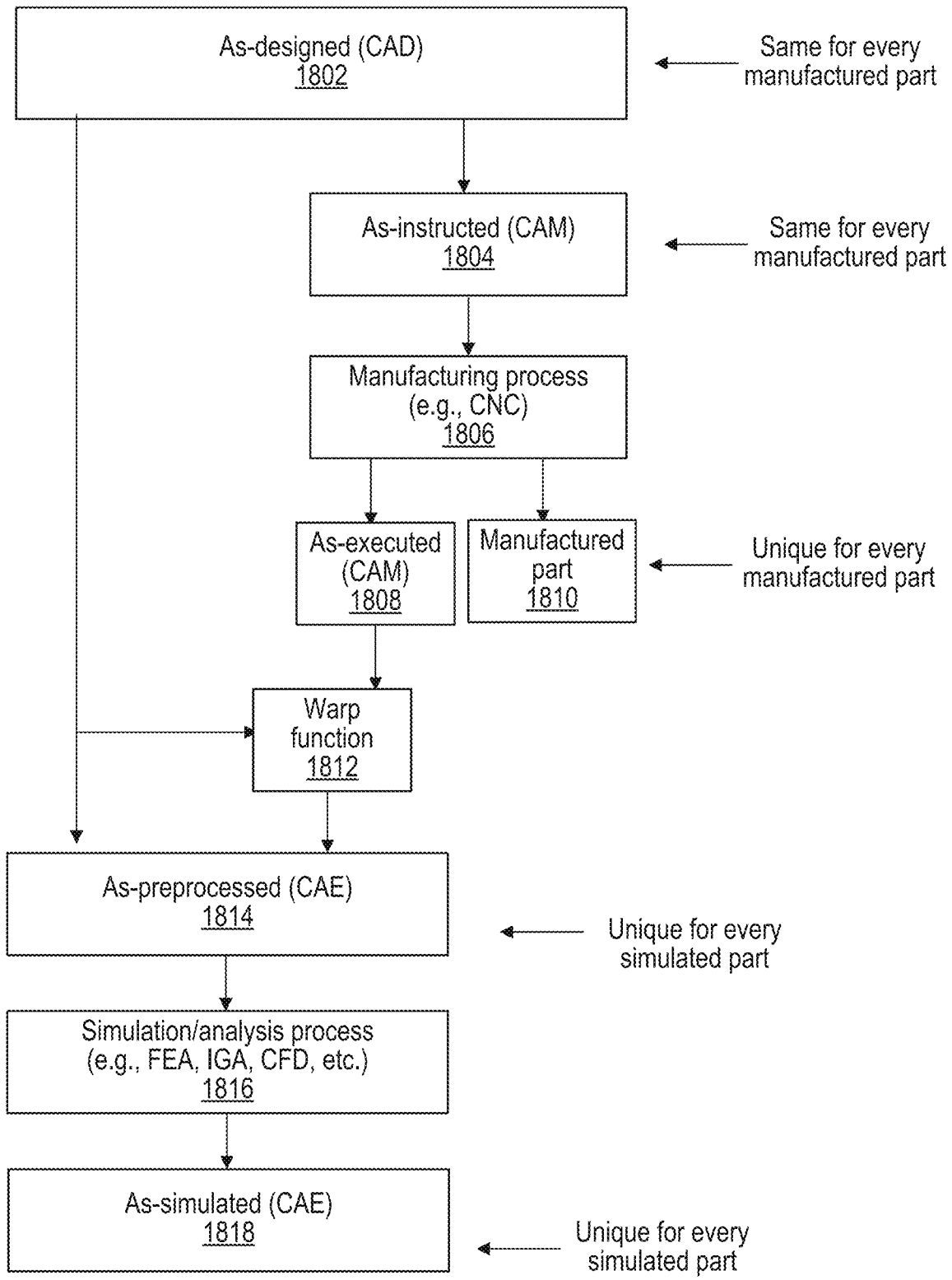
FIG. 18 illustrates an as-designed to as-simulated model workflow that utilizes as-executed data, according to some embodiments.

FIGS. 17-18—Using As-Executed Data to Improve CAE Processes

FIG. 17 illustrates an as-designed to as-simulated workflow without using as-executed data, and FIG. 18 illustrates a method where as-executed data is used to improve workflows for Computer-Aided Engineering (CAE) processes. In the workflow shown in FIG. 17, an as-designed CAD model 1702 of the nominal object design is used to construct both as-preprocessed CAE instructions 1714 for a simulation or analysis process and as-instructed CAM instructions 1704 to a manufacturing tool for manufacturing the object. The as-preprocessed (CAE) instructions may include an analysis model and analysis preprocessing data (e.g., loads, boundary conditions, etc.). The physical object is manufactured, and the simulation process occurs independently (e.g., FEA, IGA, CFD, etc.) on the physical object using the as-preprocessed CAE data. The simulation process and data is the same for each manufactured part. Note that metadata from the CAD model may be used to determine the as-preprocessed CAE instructions, e.g., such as loading, boundary conditions, etc. Finally, the result of the simulation may be stored as as-simulated CAE data 1718, which is nonspecific to any manufactured physical objects.

FIG. 18 illustrates an improved workflow that utilizes as-executed data to inform the simulation process. The as-executed data (which may differ from the as-instructed data) may be used to enhance the simulation by providing the currently missing part-specific manufacturing data as an input to the simulation preprocessing. In current implementations, simulation is solely determined by the nominal CAD geometry and PMI, making every simulation or analysis program identical. Knowledge of the unique part-specific as-executed manufacturing information provides a second input stream that may aid in identifying possible deviations from nominal geometry and PMI (e.g., GD&T), which may be utilized to individualize simulations and analyses. Said another way, the as-preprocessed CAE instructions that direct the simulation may be determined based on both the as-designed CAD model and the as-executed CAM data that describes the locations of the manufacturing tool and metadata associated with the manufacturing process (e.g. feed rate, torque, or other parameters) at a sequence of points in time.

Note that manufacturing tools typically operate within some known variance in precision, so that the as-executed locations of the tool head may differ from the as-instructed locations of the tool head. The machine controller may store the as-executed data, and the particular discrepancies between the as-instructed and as-executed data may be used to customize the simulation process for the particular as-manufactured object. In some embodiments, a warp function is determined that describes differences between the as-designed CAD model and an as-executed model of the manufactured object, and the warp function may be used to determine the as-preprocessed CAE data. The as-executed model may be analyzed either before or during the as-preprocessed CAE process for specific attributes that contribute to the part-specific simulation or analysis.

Description of Data Interchange Aspects

The quality and maturity of as-executed data exports (e.g., MTConnect) from CAM and AM software (e.g., CNC controllers) may vary greatly. Depending on the software vendor, version of MTConnect, and data requested, the form of the MTConnect data stream may or may not contain manufacturing PMI (e.g., temperature, feed rate, etc.). Also, the manufacturing machine hardware and/or software may contribute to the frequency (i.e., samples per second) of data obtained in the data stream. Interchange and translation vendors do have interchange products available, with varying levels of read/write capability between them (i.e., agents and adaptors). However, the level of semantic PMI interchange is fairly limited and varies greatly between manufacturing machine hardware and software vendor.

In order to process the morphed models, as-executed manufacturing toolpath data may be bulk exported in a specific format (e.g., manufacturing machine vendor specific) that only contains this minimal point data. A temporary IO tool (potentially custom built) may be used to write this data into memory for use in testing the morph algorithm. Formal use of both STEP and MTConnect may be utilized to manage all of the as-designed and as-executed manufacturing data, respectively, in a combined and coordinated manner.

Note that various embodiments of the techniques disclosed herein may be implemented in a variety of different ways. For example, the methods described herein may be performed by software executing on a computer system. However, while some embodiments are described in terms of one or more programs executing on a computer, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
performing, by a computer:
receiving an as-designed watertight spline model of a tangible object, wherein the as-designed watertight spline model is described in a Computer-Aided Design (CAD) model domain;
receiving a set of sweep points along a sweep trajectory for a manufacturing tool, wherein the manufacturing tool manufactures the tangible object along the sweep trajectory;
determining a sweep surface based at least in part on the set of sweep points;
sampling a plurality of model points on the as-designed watertight spline model;
projecting each model point of the plurality of model points onto a nearest as-executed point on the sweep surface to obtain a point-cloud of as-executed points on the sweep surface;
constructing an as-executed model of the tangible object based at least in part on the point-cloud of as-executed points and the as-designed watertight spline model, wherein the as-executed model comprises a watertight spline model, wherein a spline structure of the as-executed model is based at least in part on a spline structure of the as-designed watertight model;
determining a warp function based on a difference between the as-designed watertight spline model and the as-executed model of the tangible object, wherein the warp function comprises a continuous function approximating differences between the tangible object and the as-designed watertight spline model; and
storing the warp function in a non-transitory computer-readable memory medium.

2. The computer-implemented method of claim 1,
wherein determining the sweep surface based at least in part on the set of sweep points comprises:
determining an approximate sweep trajectory based on the set of sweep points; and
determining the sweep surface based at least in part on one or more of the approximate sweep trajectory, a physical shape of the manufacturing tool, and metadata associated with the manufacturing tool.

3. The computer-implemented method of claim 2,
wherein determining the approximate sweep trajectory based on the set of sweep points comprises interpolating between adjacent sweep points to construct the approximate sweep trajectory.

4. The computer-implemented method of claim 2, further comprising:
receiving data describing an as-instructed sweep trajectory;
wherein determining the approximate sweep trajectory based on the set of sweep points comprises morphing the as-instructed sweep trajectory based on the set of sweep points.

5. The computer-implemented method of claim 4, wherein the data describing the as-instructed sweep trajectory comprises:
as-instructed Computer-Aided Manufacturing (CAM) data; or
toolpath instructions.

6. The computer-implemented method of claim 1,
wherein each sweep point of the set of sweep points defines a respective location of the manufacturing tool at a respective point in time.

7. The computer-implemented method of claim 1, further comprising:
manufacturing the tangible object based at least in part on the as-designed watertight spline model, wherein manufacturing the tangible object comprises utilizing the manufacturing tool along the sweep trajectory.

8. The computer-implemented method of claim 1,
wherein the manufacturing tool is configured to manufacture the tangible object by utilizing the sweep trajectory.

9. The method of claim 1, further comprising:
receiving semantic product manufacturing information (PMI) for one or both of the as-designed watertight spline model and the as-executed model,
wherein constructing the as-executed model of the tangible object is performed further based at least in part on the semantic PMI.

10. The method of claim 9,
wherein constructing the as-executed model based at least in part on the semantic PMI comprises:
determining one or more constraints of the tangible object based on the semantic PMI; and
interpolating between adjacent as-executed points of the point cloud of as-executed points based on the one or more constraints, wherein the one or more constraints are determined based at least in part on a sampling density of the point cloud of as-executed points indicated by the semantic PMI.

11. The method of claim 9,
wherein constructing the as-executed model based at least in part on the semantic PMI comprises:
determining one or more control point derivatives for the as-executed model based at least in part on geometric constraints indicated by the semantic PMI.

12. The method of claim 1,
wherein constructing the as-executed model of the tangible object based at least in part on the point-cloud of as-executed points and the as-designed watertight spline model comprises performing an interpolation or approximation procedure of the point-cloud of as-executed points to the as-designed watertight spline model.

13. The method of claim 1,
wherein the warp function is determined in real time during a manufacturing process of the tangible object using the manufacturing tool, wherein the method further comprises:
modifying the manufacturing process based at least in part on the warp function.

14. The method of claim 13,
wherein modifying the manufacturing process based at least in part on the warp function comprises one or more of:
modifying the as-designed watertight spline model to compensate for one or more errors determined from the warp function; and
modifying one or more parameters of a manufacturing machine performing the manufacturing process based on the warp function.

15. The method of claim 14,
wherein modifying the one or more parameters of the manufacturing machine based on the warp function comprises:

determining a compensation function based on the warp function; and providing the compensation function to the manufacturing machine to modify the one or more parameters.

16. The method of claim 1, further comprising:

displaying, on a display, a colorized visual representation of the warp function.

17. The method of claim 1, wherein constructing the as-executed model of the tangible object based at least in part on the point-cloud of as-executed points and the as-designed watertight spline model comprises:

performing an interpolation or approximation procedure utilizing a spline structure of the as-designed watertight spline model to determine a plurality of degrees, control points and knot vectors of the as-executed model of the tangible object.

18. The method of claim 17, further comprising:

determining a discrepancy between the knot vectors of the as-executed model of the tangible object and knot vectors of the as-designed watertight spline model; and performing knot insertion on the knot vectors of the as-designed watertight spline model to remove the determined discrepancy.

19. The method of claim 1, wherein the as-executed model of the tangible object comprises a same spline structure as the as-designed watertight spline model.

20. The computer-implemented method of claim 1, further comprising:

determining as-planned instructions for an inspection process of the tangible object based at least in part on metadata of the as-designed watertight spline model and the warp function, wherein the as-planned instructions are described in a Computer-Aided Inspection (CAI) model domain;

performing the inspection process on the tangible object according to the as-planned instructions to produce as-inspected data; and storing the as-inspected data in the non-transitory computer-readable memory medium.

21. The computer-implemented method of claim 1, further comprising:

determining as-preprocessed instructions for a simulation or analysis process of the tangible object based at least in part on metadata of the as-designed watertight spline model and the warp function, wherein the as-preprocessed instructions are described in a Computer-Aided Engineering (CAE) model domain;

performing the simulation or analysis process on the tangible object according to the as-preprocessed instructions to produce as-simulated data; and storing the as-simulated data in the non-transitory computer-readable memory medium.

22. The computer-implemented method of claim 1, wherein the set of sweep points comprise as-executed data for the manufacturing tool, wherein the method further comprises:

receiving as-instructed data for the manufacturing tool to manufacture the tangible object;

determining a univariate warp function based on a difference between the as-instructed data and the as-executed data; and storing the univariate warp function in the non-transitory computer-readable memory medium.

23. A non-transitory computer-readable memory medium comprising program instructions which, when executed by a processor, cause a computer to:

receive an as-designed watertight spline model of a tangible object, wherein the as-designed watertight spline model is described in a Computer-Aided Design (CAD) model domain;

receive a set of sweep points along a sweep trajectory for a manufacturing tool, wherein the manufacturing tool manufactures the tangible object along the sweep trajectory;

determine a sweep surface based at least in part on the set of sweep points;

sample a plurality of model points on the as-designed watertight spline model;

project each model point of the plurality of model points onto a nearest as-executed point on the sweep surface to obtain a point-cloud of as-executed points on the sweep surface;

construct an as-executed model of the tangible object based at least in part on the point-cloud of as-executed points and the as-designed watertight spline model, wherein the as-executed model comprises a watertight spline model, wherein a spline structure of the as-executed model is based at least in part on a spline structure of the as-designed watertight model;

determine a warp function based on a difference between the as-designed watertight spline model and the as-executed model of the tangible object, wherein the warp function comprises a continuous function approximating differences between the tangible object and the as-designed watertight spline model; and store the warp function in a non-transitory computer-readable memory medium.

* * * * *

UNITED STATES PATENT AND TRADEMARK OFFICE
CERTIFICATE OF CORRECTION

| | |
|---|---|
| PATENT NO. | : 12,455,551 B2 |
| APPLICATION NO. | : 18/963285 |
| DATED | : October 28, 2025 |
| INVENTOR(S) | : Benjamin Urick et al. |

Page 1 of 1

It is certified that error appears in the above-identified patent and that said Letters Patent is hereby corrected as shown below:

On the Title Page

In the (73) Assignee:
Please delete "n Variate, Inc." and insert -- nVariate, Inc. --.

Signed and Sealed this
Sixth Day of January, 2026

John A. Squires
*Director of the United States Patent and Trademark Office*